US011739169B2

(12) United States Patent
Hagadorn et al.

(10) Patent No.: US 11,739,169 B2
(45) Date of Patent: Aug. 29, 2023

(54) SOLUBILITY IMPROVEMENT OF NON-METALLOCENE TRANSITION METAL COMPLEXES IN ALIPHATIC HYDROCARBON SOLVENTS

(71) Applicant: ExxonMobil Chemical Patents Inc., Baytown, TX (US)

(72) Inventors: John R. Hagadorn, Houston, TX (US); Peijun Jiang, Katy, TX (US); Francis C. Rix, Houston, TX (US); Charles J. Harlan, Houston, TX (US); Jo Ann M. Canich, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 302 days.

(21) Appl. No.: 17/226,659

(22) Filed: Apr. 9, 2021

(65) Prior Publication Data

US 2021/0332164 A1    Oct. 28, 2021

Related U.S. Application Data

(60) Provisional application No. 63/015,287, filed on Apr. 24, 2020.

(51) Int. Cl.
*C08F 4/64* (2006.01)
*C08F 4/642* (2006.01)
*C08F 4/659* (2006.01)
*C08F 4/62* (2006.01)

(52) U.S. Cl.
CPC ...... *C08F 4/65912* (2013.01); *C08F 4/62003* (2013.01); *C08F 4/642* (2013.01); *C08F 4/64003* (2013.01); *C08F 4/65908* (2013.01)

(58) Field of Classification Search
CPC .............................. C08F 4/62003; C08F 10/00
See application file for complete search history.

(56) References Cited

U.S. PATENT DOCUMENTS

| 3,242,099 A | 3/1966 | Manyik et al. ............... 252/429 |
| 4,268,418 A | 5/1981 | Hoff .............................. 252/429 |
| 5,066,631 A | 11/1991 | Sangokoya et al. .......... 502/152 |
| 5,726,115 A | 3/1998 | Horton et al. ................ 502/152 |
| 6,175,409 B1 | 1/2001 | Nielsen et al. ............... 356/337 |
| 6,260,407 B1 | 7/2001 | Petro et al. ................... 73/61.52 |
| 6,294,388 B1 | 9/2001 | Petro ................................ 436/8 |
| 6,306,658 B1 | 10/2001 | Turner et al. ................... 436/37 |
| 6,406,632 B1 | 6/2002 | Safir et al. .................... 210/656 |
| 6,436,292 B1 | 8/2002 | Petro ............................ 210/656 |
| 6,454,947 B1 | 9/2002 | Safir et al. .................... 210/656 |
| 6,455,316 B1 | 9/2002 | Turner et al. ................... 436/37 |
| 6,461,515 B1 | 10/2002 | Safir et al. .................... 210/656 |
| 6,475,391 B2 | 11/2002 | Safir et al. .................... 210/656 |
| 6,489,168 B1 | 12/2002 | Wang et al. ..................... 436/37 |
| 6,491,816 B2 | 12/2002 | Petro .......................... 210/198.2 |
| 6,491,823 B1 | 12/2002 | Safir et al. .................... 210/656 |
| 6,838,526 B1 | 1/2005 | Sone et al. .................. 525/332.8 |
| 6,841,502 B2 | 1/2005 | Boussie et al. ............... 502/125 |
| 6,900,321 B2 | 5/2005 | Boussie et al. ................... 546/4 |
| 7,018,949 B2 | 3/2006 | Boussie et al. ............... 502/155 |
| 7,157,532 B2 | 1/2007 | Payer et al. .................. 526/118 |
| 7,256,296 B2 | 8/2007 | Diamond et al. ............. 548/101 |
| 7,973,116 B2 | 7/2011 | Hagadorn et al. ............ 526/172 |
| 8,394,902 B2 | 3/2013 | Hagadorn et al. ............ 526/172 |
| 8,501,659 B2 | 8/2013 | Johns ........................... 502/167 |
| 8,524,845 B2 | 9/2013 | Aliyev et al. ................. 526/161 |
| 8,592,615 B2 | 11/2013 | Kuhlman et al. ............... 556/51 |
| 9,102,773 B2 | 8/2015 | Hagadorn et al. .... C08F 210/06 |
| 9,290,519 B2 | 3/2016 | Hagadorn et al. ........ C07F 7/00 |
| 9,534,070 B2 | 1/2017 | Spencer et al. ........ C08F 232/04 |
| 9,663,594 B2 | 5/2017 | Hlavinka ............... C08F 110/02 |
| 9,994,657 B2 | 6/2018 | Atienza et al. ....... C08F 210/16 |
| 2011/0224391 A1 | 9/2011 | Hagadorn et al. ............ 526/161 |
| 2011/0301310 A1 | 12/2011 | Hagadorn et al. ............ 526/172 |

(Continued)

FOREIGN PATENT DOCUMENTS

| WO | WO 2000/009255 | 2/2000 | ............. B01J 19/00 |
| WO | WO 2006/020624 | 2/2006 | ................ C08F 4/02 |

(Continued)

OTHER PUBLICATIONS

Boussie, T. et al. (2003) "A Fully Integrated High-Throughput Screening Methodology for the Discovery of New Polyolefin Catalysts: Discovery of a New Class of High Temperature Single-Site Group (IV) Copolymerization Catalysts," *J. Am. Chem. Soc.*, v.125(14), pp. 4306-4317.

(Continued)

*Primary Examiner* — Caixia Lu

(57) ABSTRACT

It has become desirable to limit or exclude aromatic solvents, such as toluene, from polymerization reactions. For polymerization reactions employing a non-metallocene transition metal complex as a precursor to a polymerization catalyst, exclusion of aromatic solvents may be difficult due to the limited solubility of such complexes in aliphatic hydrocarbon solvents. Aliphatic hydrocarbon solutions suitable for conducting olefin polymerization reactions, particularly solution polymerization reactions, may comprise: a non-metallocene transition metal complex dissolved in an aliphatic hydrocarbon solvent at a concentration ranging from about 2 mM to about 20 mM at 25° C. in the presence of an organoaluminum compound. A molar ratio of aluminum of the organoaluminum compound to transition metal of the transition metal complex is about 1:1 or greater, and the organoaluminum compound comprises at least about 8 carbons per aluminum.

20 Claims, No Drawings

(56) References Cited

U.S. PATENT DOCUMENTS

| | | | |
|---|---|---|---|
| 2013/0172498 A1 | 7/2013 | Hlavinka et al. | 526/129 |
| 2018/0002352 A1 | 1/2018 | Hagadorn et al. | C07F 7/00 |
| 2019/0127497 A1 | 5/2019 | Luo et al. | C08F 4/6592 |
| 2019/0144653 A1 | 5/2019 | Tsou et al. | C08L 23/16 |

FOREIGN PATENT DOCUMENTS

| | | | |
|---|---|---|---|
| WO | WO 2012/027448 | 3/2012 | C08F 4/64 |
| WO | WO 2016/153682 | 9/2016 | C07F 7/00 |
| WO | WO 2017/004462 | 1/2017 | C08F 210/16 |
| WO | WO 2018/022279 | 2/2018 | C07F 7/00 |

OTHER PUBLICATIONS

Boussie, T. et al. (2006) "Nonconventional catalysts for isotactic propene polymerization in solution developed by using high-throughput-screening technologies," *Angew. Chem. Int. Ed.*, v.45(20), pp. 3278-3283.

Diamond, G. et al. (2011) "High-Throughput Discovery and Optimization of Hafnium Heteroaryl-amido Catalysts for the Isospecific Polymerization of Propylene," *ACS Catal.*, v.1(8), pp. 887-900.

Gibson, V. C. et al. (2003) "Advances in Non-metallocene olefin Polymerization Catalysis," *Chem. Rev.*, v.103, pp. 283-315.

US 11,739,169 B2

SOLUBILITY IMPROVEMENT OF NON-METALLOCENE TRANSITION METAL COMPLEXES IN ALIPHATIC HYDROCARBON SOLVENTS

PRIORITY

The present application claims the benefit under 35 U.S.C. 119 of U.S. Provisional Patent Application 63/015,287, filed Apr. 24, 2020, the entirety of which is hereby incorporated by reference.

FIELD

The present disclosure relates to non-metallocene transition metal complexes having improved solubility in aliphatic hydrocarbon solvents and polymerization therewith.

BACKGROUND

Polyolefins are commonly employed commercial polymers because of their robustness and wide-ranging and tunable physical properties. Polyolefins are typically prepared using a catalyst to promote polymerization of one or more olefinic monomers, frequently in the presence of a cocatalyst or activator. Catalysts suitable for promoting olefin polymerization reactions include various transition metal complexes, such as Ziegler-Natta catalysts and metallocenes. Transition metal complexes of these types are usually activated with metallate activators containing an element from Group 13 of the Periodic Table, such as alumoxanes and non-coordinating anion activators.

Due to solubility limitations of Ziegler-Natta and similar transition metal complexes, aromatic solvents have commonly been employed for manipulating the complexes during olefin polymerization reactions. In particular, concentrated toluene solutions are often used for introducing non-metallocene transition metal complexes into a reactor due to the limited solubility of these types of complexes in aliphatic hydrocarbon solvents. The solubility of unmodified non-metallocene transition metal complexes in common aliphatic solvents fails to exceed 2 mM in most instances. Metallocene complexes, in contrast, typically exhibit better solubility in aliphatic hydrocarbon solvents, but they tend to produce polymer products having considerably different properties than do non-metallocene transition metal complexes. In particular, metallocene complexes usually exhibit a single catalytic site and produce narrow polymer molecular weight distributions, whereas Ziegler-Natta type catalysts tend to be multi-site and produce considerably broader molecular weight distributions and higher molecular weights. Thus, access to certain classes of polymers may be problematic without using toluene or other aromatic hydrocarbon solvents.

Recent efforts have sought to eliminate or significantly lower the amounts of aromatic solvents, such as toluene, used in olefin polymerization processes, including as a delivery vehicle and as a reaction solvent, to eliminate traces of residual aromatic solvent in the resulting polymer, which may be problematic for some applications. From a process standpoint, eliminating aromatic solvents from olefin polymerization processes may allow post-polymerization devolatilization operations to be minimized, thereby decreasing process costs and complexity. However, the limited solubility of unmodified transition metal complexes, particularly non-metallocene transition metal complexes, in common aliphatic solvents, particularly aliphatic hydrocarbon solvents, has made implementation of these process changes problematic.

One approach for improving the solubility of non-metallocene transition metal complexes in aliphatic hydrocarbon solvents includes structurally modifying the complexes themselves, specifically by introducing long-chain alkyl groups thereto. This approach can be problematic in many instances, as reactions to introduce the long-chain alkyl groups may be difficult and/or low yielding. In addition, introducing long-chain alkyl groups to the complex may significantly decrease the catalytic activity, particularly if the alkyl groups interfere with olefin coordination to the active catalytic site. Non-aromatic co-solvents may also increase solubility of the complexes in some cases, but they too may have a negative impact on catalytic activity. US Patent Application Publication 2019/0144653 discloses olefin polymerization processes that take place in solution in a limited amount of toluene. U.S. Pat. No. 5,726,115 also discloses polymerization processes that may take place in solution in aliphatic hydrocarbon solvents.

For gas phase and slurry phase polymerization reactions, it may be desirable for the catalyst to be affixed to a support material. The limited solubility of non-metallocene transition metal complexes in aliphatic hydrocarbon solvents may similarly lead to problematic deposition of the complexes upon a support material. U.S. Pat. Nos. 4,268,418, 7,157,532, 9,663,594, and 9,994,657; and US Patent Application Publication 2013/0172498 disclose olefin polymerization processes employing aliphatic hydrocarbon solvents, in which a transition metal complex is affixed to a support material.

Other references of interest include: Gibson, V. C. et al. (2003) "Advances in Non-metallocene olefin Polymerization Catalysis," *Chem. Rev.*, v. 103, pages 283-315; U.S. Pat. Nos. 3,242,099; 5,066,631; 5,726,115; 6,838,526; 7,157,532; 8,394,902; 8,524,845; 9,102,773; 9,534,070; 9,994,657; 9,963,594; US 2013/0172498; US 2019/0127497; and WO 2012/027448.

SUMMARY

Provided herein are catalyst solutions comprising a non-metallocene transition metal complex dissolved in an aliphatic hydrocarbon solvent at a concentration ranging from about 2 mM to about 20 mM at 23° C. in the presence of an organoaluminum compound. A molar ratio of aluminum of the organoaluminum compound to transition metal of the non-metallocene transition metal complex is about 1:1 or greater, and the organoaluminum compound comprises at least about 8 carbons per aluminum. The non-metallocene transition metal complex has an aliphatic hydrocarbon solubility of less than 2 mM in an absence of the organoaluminum compound. Preferably, the catalyst solutions comprise at most about 5 ppm toluene or other aromatic solvents, and more preferably, are free of toluene or other aromatic solvents.

Catalyst systems may comprise a catalyst solution comprising a non-metallocene transition metal complex dissolved in an aliphatic hydrocarbon solvent at a concentration ranging from about 2 mM to about 20 mM at 23° C. in the presence of an organoaluminum compound, and at least one activator effective to activate the non-metallocene transition metal complex. A molar ratio of aluminum of the organoaluminum compound to transition metal of the non-metallocene transition metal complex is about 1:1 or greater, and the organoaluminum compound comprises at least about 8 carbons per aluminum. The non-metallocene transition metal complex has an aliphatic hydrocarbon solubility of less than 2 mM in an absence of the organoaluminum compound. Preferably, the catalyst solutions comprise at most about 5 ppm toluene or other aromatic solvents, and more preferably, are free of toluene or other aromatic solvents.

Polymerization methods may comprise contacting a catalyst system with an olefinic feed comprising one or more olefins under polymerization reaction conditions to form a polyolefin. The catalyst system comprises a non-metallocene transition metal complex dissolved in an aliphatic hydrocarbon solvent at a concentration ranging from about 2 mM to about 20 mM at 23° C. in the presence of an organoaluminum compound, and at least one activator effective to activate the non-metallocene transition metal complex. A molar ratio of aluminum of the organoaluminum compound to transition metal of the non-metallocene transition metal complex is about 1:1 or greater, and the organoaluminum compound comprises at least about 8 carbons per aluminum. The non-metallocene transition metal complex has an aliphatic hydrocarbon solubility of less than 2 mM in an absence of the organoaluminum compound. Preferably, the catalyst solutions comprise at most about 5 ppm toluene or other aromatic solvents, and more preferably, are free of toluene or other aromatic solvents.

DETAILED DESCRIPTION

The present disclosure relates to olefin polymerization and, more specifically, to high-concentration aliphatic hydrocarbon solutions of non-metallocene transition metal complexes and polymerization therewith.

As discussed above, it can be desirable to eliminate or significantly minimize the presence of toluene and other aromatic solvents in olefin polymerization processes due to toxicity/environmental concerns and/or to improve polymer product quality by precluding retention of trace aromatic solvents in the resulting polymer. The limited solubility of many non-metallocene transition metal complexes in aliphatic hydrocarbon solvents has significantly hampered attainment of the foregoing goal. Although non-metallocene transition metal complexes may be synthetically modified to introduce solubilizing long-chain alkyl groups thereto, the synthetic reactions may be challenging, expensive, and/or low-yielding, and decreased catalytic activity may be realized in a number of instances.

The present disclosure provides techniques for preparing solutions of various non-metallocene transition metal complexes in aliphatic hydrocarbon solvents without conducting time-consuming synthetic reactions to afford modified complexes having long-chain alkyl functionalization. Instead, the present disclosure allows non-metallocene transition metal complexes to be solubilized post-synthetically in aliphatic hydrocarbon solvents at a concentration above the complexes' native solubility value at a given temperature, while still retaining substantially the same, or at least acceptable, catalytic activity. Thus, the present disclosure greatly expands the breadth of catalysts suitable for conducting olefin polymerization reactions in the presence of aliphatic hydrocarbon solvents. Advantageously, the present disclosure may allow non-metallocene transition metal complexes that are otherwise poor catalysts due to their inadequate aliphatic hydrocarbon solubility to be effectively used for promoting olefin polymerization in aliphatic hydrocarbon solutions.

More specifically, the present disclosure surprisingly demonstrates that by combining at least a stoichiometric amount of a suitable organoaluminum compound with a non-metallocene transition metal complex, preferably a non-metallocene transition metal complex bearing two methyl group ligands bound to the transition metal, significantly enhanced solubility of the complex in aliphatic hydrocarbon solvents may be realized. That is, a 1:1 molar ratio or greater of the organoaluminum compound is combined with the non-metallocene transition metal complex in order to accomplish the foregoing. Suitable organoaluminum compounds may comprise at least about 8 carbons per aluminum, preferably at least about 12 carbons per aluminum, and more preferably at least about 16 carbons per aluminum, to promote such solubilization in aliphatic hydrocarbon solvents. Without being bound by theory or mechanism, the organoaluminum compounds are believed to transfer a solubilizing alkyl group to the non-metallocene transition metal complex in situ to form a reaction product and/or associate together to form an adduct having improved aliphatic hydrocarbon solubility. When solubility is promoted in situ in the foregoing manner, the non-metallocene transition metal complexes may retain substantially the same degree of catalytic activity as when treatment with an organoaluminum compound is not performed.

In addition to facilitating preparation of high-concentration aliphatic hydrocarbon solutions of non-metallocene transition metal complexes that maintain significant catalytic activity, the catalyst solutions of the present disclosure advantageously remain compatible with various types of activators used in conjunction with promoting olefin polymerization reactions. In particularly advantageous process configurations, the catalyst solutions of the present disclosure may be contacted with activators that are also disposed in aliphatic hydrocarbon solvents to form catalyst systems also lacking or having substantially minimized toluene and other aromatic hydrocarbon solvents. A range of aliphatic hydrocarbon-soluble activators may be suitable for use in catalyst systems and polymerization processes minimizing or eliminating aromatic hydrocarbon solvents through use of the disclosure herein, since solubilizing long-chain alkyl groups may be much more readily tolerated in the activator portion of a catalyst system.

The catalyst solutions and catalyst systems of the present disclosure may be particularly advantageous for use in conjunction with solution polymerization processes. It is to be appreciated, however, that gas phase and slurry phase polymerization processes may also be facilitated through use of the disclosure herein. In particular, the catalyst solutions of the present disclosure may be deposited to form supported non-metallocene transition metal catalysts and catalyst systems without using substantial aromatic hydrocarbon solvents to promote deposition. Forming supported catalysts and supported catalyst systems in the absence or substantial absence of toluene and other aromatic solvents can again aid in limiting the incorporation of trace aromatic solvents in a polymer product obtained therefrom.

Definitions

All numerical values within the detailed description and the claims herein are modified by "about" or "approximately" with respect to the indicated value, and take into account experimental error and variations that would be expected by a person having ordinary skill in the art. Unless otherwise indicated, room temperature is about 23° C.

As used in the present disclosure and claims, the singular forms "a," "an," and "the" include plural forms unless the context clearly dictates otherwise.

For the purposes of the present disclosure, the new numbering scheme for groups of the Periodic Table is used. In said numbering scheme, the groups (columns) are numbered sequentially from left to right from 1 through 18, excluding the f-block elements (lanthanides and actinides). Under this scheme, the term "transition metal" refers to any atom from groups 3-12 of the Periodic Table, inclusive of the lanthanides and actinide elements. Ti, Zr, and Hf are group 4 transition metals, for example.

As used herein, Mn is number average molecular weight, Mw is weight average molecular weight, and Mz is z average molecular weight, wt % is weight percent, and mol % is mole percent. Molecular weight distribution (MWD), also referred to as polydispersity index (PDI), is defined to be Mw divided by Mn. Unless otherwise noted, all molecular weight units (e.g., Mw, Mn, and Mz) are in units of g/mol (g·mol$^{-1}$).

For purposes of this disclosure, when a polymer, copolymer, or oligomer, particularly a polyolefin, is referred to as comprising an olefin, the olefin present in such polymer, copolymer, or oligomer is the polymerized form of the olefin. For example, when a copolymer is said to have a "propylene" content of 0 wt % to 5 wt %, it is to be understood that the mer unit in the copolymer is derived from the monomer propylene in the polymerization reaction and said derived units are present at 0 wt % (i.e., absent) to 5 wt %, based upon the weight of the copolymer. As used herein, the terms "polymer" and "oligomer" (and grammatical variations thereof) are used interchangeably to refer to a molecule having two or more of the same or different mer units. As used herein, the term "polymerize" (and grammatical variations thereof e.g., polymerization) is used to refer to a process of generating a molecule having two or more of the same or different mer units from two or more of the same or different monomers. A "homopolymer" is a polymer (or oligomer) having mer units that are the same. A "copolymer" is a polymer (or oligomer) having two or more mer units that are different from each other. A "terpolymer" is a polymer (or oligomer) having three mer units that are different from each other. "Different," as used to refer to mer units, indicates that the mer units differ from each other by at least one atom or are different isomerically. Accordingly, the definition of copolymer, as used herein, includes terpolymers and like higher polymers. A "decene polymer" or "decene copolymer," for example, is a polymer or copolymer comprising at least 50 mol % decene-derived units. Other olefin polymers comprising a predominant olefin mer unit may be characterized similarly.

The term "independently," when referenced to selection of multiple items from within a given group, means that the selected choice for a first item does not necessarily influence the choice of any second or subsequent item. That is, independent selection of multiple items within a given group means that the individual items may be the same or different from one another.

The terms "group," "radical," and "substituent" may be used interchangeably herein.

Reference to a group without specifying a particular isomer thereof (e.g., butyl) expressly discloses all isomers (e.g., n-butyl, iso-butyl, sec-butyl, tert-butyl and cyclobutyl), unless otherwise indicated.

The term "hydrocarbon" refers to a class of compounds having hydrogen bound to carbon, and encompasses saturated hydrocarbon compounds, unsaturated hydrocarbon compounds, and mixtures of hydrocarbon compounds (saturated and/or unsaturated), including mixtures of hydrocarbon compounds having different numbers of carbon atoms.

The term "$C_n$" refers to hydrocarbon(s) or a hydrocarbyl group having n carbon atom(s) per molecule or group, wherein n is a positive integer. Such hydrocarbon compounds may be one or more of linear, branched, cyclic, acyclic, saturated, unsaturated, aliphatic, or aromatic. As used herein, a cyclic hydrocarbon may be referred to as "carbocyclic," which includes saturated, unsaturated, and partially unsaturated carbocyclic compounds, as well as aromatic carbocyclic compounds. The term "heterocyclic" refers to a carbocyclic ring containing at least one ring heteroatom.

In particular, the term "heterocyclic" refers to a cyclic group where a ring carbon atom (or two or three ring carbon atoms) has been replaced with a heteroatom, such as N, O, or S. A heterocyclic ring is a ring having a heteroatom in the ring structure as opposed to a heteroatom-substituted ring where a hydrogen on a ring atom is replaced with a heteroatom. For example, tetrahydrofuran is a heterocyclic ring, and 4-N,N-dimethylaminophenyl is a heteroatom-substituted ring substituent.

Substituted heterocyclic also means a heterocyclic group where at least one hydrogen atom of the heterocyclic radical has been substituted with at least a non-hydrogen group, such as a hydrocarbyl group, a heteroatom or a heteroatom containing group, such as halogen (such as Br, Cl, F or I) or at least one functional group such as —NR*$_2$, —OR*, —SeR*, —TeR*, —PR*$_2$, —AsR*$_2$, —SbR*$_2$, —SR*, —BR*$_2$, —SiR*, —SiR*$_3$, —GeR*, —GeR*$_3$, —SnR*, —SnR*$_3$, —PbR*$_3$, and the like, where each R* is independently a hydrocarbyl or halocarbyl radical.

The terms "hydrocarbyl radical," "hydrocarbyl group," or "hydrocarbyl" may be used interchangeably and are defined to mean a group consisting of hydrogen and carbon atoms only and bearing at least one unfilled valence position when removed from a parent compound. A hydrocarbyl group can be saturated or unsaturated, linear or branched, cyclic or acyclic, aromatic or non-aromatic. Preferred hydrocarbyls are $C_1$-$C_{100}$ radicals that may be linear, cyclic and/or branched. Examples of such radicals include, but are not limited to, alkyl groups such as methyl, ethyl, n-propyl, isopropyl, n-butyl, isobutyl, sec-butyl, tert-butyl, pentyl, iso-amyl(isopentyl), hexyl, octyl, cyclopropyl, cyclobutyl, cyclopentyl, cyclohexyl, cyclooctyl, and the like. The term "hydrocarbyl group having 1 to about 100 carbon atoms" refers to a moiety selected from a linear, cyclic and/or branched $C_1$-$C_{100}$ hydrocarbyl group.

The term "optionally substituted" means that a hydrocarbon or hydrocarbyl group may be unsubstituted or substituted. For example, the term "optionally substituted hydrocarbyl" refers to replacement of at least one hydrogen atom or carbon atom in a hydrocarbyl group with a heteroatom or heteroatom functional group. Unless otherwise specified, any of the hydrocarbyl groups herein may be optionally substituted.

Silylcarbyl radicals (also referred to as silylcarbyls, silylcarbyl groups, or silylcarbyl substituents) are radicals in which one or more hydrocarbyl hydrogen atoms have been substituted with at least one SiR*$_3$ containing group or where at least one —Si(R*)$_2$— has been inserted within the hydrocarbyl radical or substituted for carbon within the hydrocarbyl radical, where R* is independently a hydrocarbyl or halocarbyl radical, and two or more R* may join together to form a substituted or unsubstituted saturated, partially unsaturated or aromatic cyclic or polycyclic ring structure. Silylcarbyl radicals may be bonded via a silicon atom or a carbon atom.

Substituted silylcarbyl radicals are silylcarbyl radicals in which at least one hydrogen atom has been substituted with at least one functional group such as $NR^*_2$, $OR^*$, $SeR^*$, $TeR^*$, $PR^*_2$, $AsR^*_2$, $SbR^*_2$, $SR^*$, $BR^*_2$, $GeR^*_3$, $SnR^*_3$, $PbR_3$ and the like or where at least one non-hydrocarbon atom or group has been inserted within the silylcarbyl radical, such as —O—, —S—, —Se—, —Te—, —N(R*)—, =N—, —P(R*)—, =P—, —As(R*)—, =As—, —Sb(R*)—, =Sb—, —B(R*)—, =B—, —Ge(R*)$_2$—, —Sn(R*)$_2$—, —Pb(R*)$_2$— and the like, where R* is independently a hydrocarbyl or halocarbyl radical, and two or more R* may join together to form a substituted or unsubstituted saturated, partially unsaturated or aromatic cyclic or polycyclic ring structure.

Halocarbyl radicals (also referred to as halocarbyls, halocarbyl groups or halocarbyl substituents) are radicals in which one or more hydrocarbyl hydrogen atoms have been substituted with at least one halogen (e.g., F, Cl, Br, I) or halogen-containing group (e.g., $CF_3$).

Substituted halocarbyl radicals are radicals in which at least one halocarbyl hydrogen or halogen atom has been substituted with at least one functional group such as $NR^*_2$, $OR^*$, $SeR^*$, $TeR^*$, $PR^*_2$, $AsR^*_2$, $SbR^*_2$, $SR^*$, $BR^*_2$, $SiR^*_3$, $GeR^*_3$, $SnR^*_3$, $PbR^*_3$, and the like or where at least one non-carbon atom or group has been inserted within the halocarbyl radical such as —O—, —S—, —Se—, —Te—, —N(R*)—, =N—, —P(R*)—, =P—, —As(R*)—, =As—, —Sb(R*)—, =Sb—, —B(R*)—, =B—, —Si(R*)$_2$—, —Ge(R*)$_2$—, —Sn(R*)$_2$—, —Pb(R*)$_2$— and the like, where R* is independently a hydrocarbyl or halocarbyl radical, provided that at least one halogen atom remains on the original halocarbyl radical. Additionally, two or more R* may join together to form a substituted or unsubstituted saturated, partially unsaturated or aromatic cyclic or polycyclic ring structure.

Germylcarbyl radicals (also referred to as germylcarbyls, germylcarbyl groups or germylcarbyl substituents) are radicals in which one or more hydrocarbyl hydrogen atoms have been substituted with at least one $GeR^*_3$ containing group or where at least one —Ge(R*)$_2$— has been inserted within the hydrocarbyl radical where R* is independently a hydrocarbyl or halocarbyl radical, and two or more R* may join together to form a substituted or unsubstituted saturated, partially unsaturated or aromatic cyclic or polycyclic ring structure. Germylcarbyl radicals may be bonded via a germanium atom or a carbon atom.

Substituted germylcarbyl radicals are germylcarbyl radicals in which at least one hydrogen atom has been substituted with at least one functional group such as $NR^*_2$, $OR^*$, $SeR^*$, $TeR^*$, $PR_{*2}$, $AsR_{*2}$, $SbR_{*2}$, $SR^*$, $BR_{*2}$, $SiR_{*3}$, $SnR_{*3}$, $Pb_{R3}$ and the like or where at least one non-hydrocarbon atom or group has been inserted within the germylcarbyl radical, such as —O—, —S—, —Se—, —Te—, —N(R*)—, =N—, —P(R*)—, =P—, —As(R*)—, =As—, —Sb(R*)—, =Sb—, —B(R*)—, =B—, —Si(R*)$_2$—, —Sn(R*)$_2$—, —Pb(R*)$_2$— and the like, where R* is independently a hydrocarbyl or halocarbyl radical, and two or more R* may join together to form a substituted or unsubstituted saturated, partially unsaturated or aromatic cyclic or polycyclic ring structure.

The terms "linear" or "linear hydrocarbon" refer to a hydrocarbon or hydrocarbyl group having a continuous carbon chain without side chain branching.

The terms "branched" or "branched hydrocarbon" refer to a hydrocarbon or hydrocarbyl group having a linear carbon chain or a carbocyclic ring, in which a hydrocarbyl side chain extends from the linear carbon chain or the carbocyclic ring.

The terms "saturated" or "saturated hydrocarbon" refer to a hydrocarbon or hydrocarbyl group in which all carbon atoms are bonded to four other atoms, with the exception of an unfilled valence position being present upon carbon in a hydrocarbyl group.

The terms "unsaturated" or "unsaturated hydrocarbon" refer to a hydrocarbon or hydrocarbyl group in which one or more carbon atoms are bonded to less than four other atoms, exclusive of an open valence position upon carbon being present. That is, the term "unsaturated" refers to a hydrocarbon or hydrocarbyl group bearing one or more double and/or triple bonds, with the double and/or triple bonds being between two carbon atoms and/or between a carbon atom and a heteroatom.

The terms "alkyl radical," and "alkyl" are used interchangeably throughout the present disclosure and refer to a hydrocarbyl group having no unsaturated carbon-carbon bonds, and which may be optionally substituted. An alkyl group can be linear, branched, cyclic, or a combination thereof. "Alkyl radicals" are defined to be $C_1$-$C_{100}$ alkyls that may be linear, branched, and/or cyclic. Examples of such radicals can include methyl, ethyl, n-propyl, isopropyl, n-butyl, isobutyl, sec-butyl, tert-butyl, pentyl, iso-amyl, hexyl, octyl cyclopropyl, cyclobutyl, cyclopentyl, cyclohexyl, cyclooctyl, and the like. Substituted alkyl radicals are radicals in which at least one hydrogen atom of the alkyl radical has been substituted with at least a non-hydrogen group, such as a hydrocarbyl group, a heteroatom or a heteroatom containing group, such as halogen (such as Br, Cl, F or I) or at least one functional group such as $—NR^*_2$, $—OR^*$, $—SeR^*$, $—TeR^*$, $—PR^*_2$, $—AsR^*_2$, $—SbR^*_2$, $—SR^*$, $—BR^*$, $—SiR^*$, $—SiR^*_3$, $—GeR^*$, $—GeR^*_3$, $—SnR^*$, $—SnR^*_3$, $—PbR^*_3$, and the like, where each R* is independently a hydrocarbyl or halocarbyl radical, and two or more R* may join together to form a substituted or unsubstituted saturated, partially unsaturated or aromatic cyclic or polycyclic ring structure, or where at least one heteroatom has been inserted within a hydrocarbyl ring.

The term "branched alkyl" means that an alkyl group contains a tertiary or quaternary carbon (a tertiary carbon is a carbon atom bound to three other carbon atoms; a quaternary carbon is a carbon atom bound to four other carbon atoms). For example, 3,5,5 trimethylhexylphenyl is an alkyl group (hexyl) having three methyl branches (hence, one tertiary and one quaternary carbon) and thus is a branched alkyl bound to a phenyl group.

The terms "cycloalkyl" or "cycloalkyl group" interchangeably refer to a saturated hydrocarbyl group wherein the carbon atoms form one or more ring structures. The terms "cycloalkenyl" or "cycloalkenyl group" interchangeably refer to a cyclic hydrocarbyl group comprising a carbon-carbon double bond in the ring.

The terms "alkene" and "olefin" are used synonymously herein. Similarly, the terms "alkenic" and "olefinic" are used synonymously herein. Unless otherwise noted, all possible geometric isomers are encompassed by these terms. The term "alkenyl" refers to a hydrocarbyl group having a carbon-carbon double bond. Alkenyl groups may be straight-chain, branched-chain, or cyclic and contain one or more carbon-carbon double bonds. Alkenyl radicals may be optionally substituted. Examples of alkenyl groups can include ethenyl, propenyl, allyl, 1,4-butadienyl, cyclopropenyl, cyclobutenyl, cyclopentenyl, cyclohexenyl, cyclooctenyl and the like.

The term "arylalkenyl" refers to an aryl group where a hydrogen atom has been replaced with an alkenyl or substituted alkenyl group. For example, styryl indenyl is an indene substituted with an arylalkenyl group (a styrene group).

The carbon-carbon double bond in an alkene may be in various structural or geometric isomer forms, which may include vinylidenes, vinyls, disubstituted vinylenes and trisubstituted vinylenes.

The term "vinyl" refers to an olefin represented by the following formula

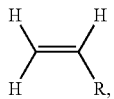

wherein R is a hydrocarbyl group, preferably a saturated hydrocarbyl group such as an alkyl group.

The term "vinylidene" refers to an olefin represented by the following formula

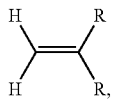

wherein each R is an independently selected hydrocarbyl group, preferably a saturated hydrocarbyl group such as an alkyl group. Vinylidenes are 1,1-disubstituted vinylene groups.

The term "disubstituted vinylene" refers to
(i) an olefin represented by the following formula

or
(ii) an olefin represented by the following formula

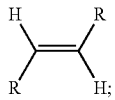

or
(iii) a mixture thereof in any proportion,
wherein each R is an independently selected hydrocarbyl group, preferably a saturated hydrocarbyl group such as an alkyl group. The term "disubstituted vinylene" is not inclusive of the term "vinylidene." That is, disubstituted vinylenes represent only 1,2-disubstituted vinylene groups and do not include vinylidene groups.

The term "trisubstituted vinylene" refers to an olefin represented by the following formula

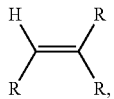

wherein each R is an independently selected hydrocarbyl group, preferably a saturated hydrocarbyl group such as an alkyl group. Alternatively, two R groups on adjacent carbon atoms may together form a non-aromatic ring structure, with a third R group remaining as a pendant hydrocarbyl group.

The term "alpha olefin" refers to an olefin having a terminal carbon-carbon double bond in the structure thereof (R"HC=CH$_2$, where R" is hydrogen or a hydrocarbyl group; preferably R" is an alkyl group). Non-limiting examples of alpha olefins include, for instance, ethylene, propylene, 1-butene, 1-pentene, 1-hexene, 1-heptene, 1-octene, 1-nonene, 1-decene, 1-undecene 1-dodecene, 1-tridecene, 1-tetradecene, 1-pentadecene, 1-hexadecene, 1-heptadecene, 1-octadecene, 1-nonadecene, 1-eicosene, 1-heneicosene, 1-docosene, 1-tricosene, 1-tetracosene, 1-pentacosene, 1-hexacosene, 1-heptacosene, 1-octacosene, 1-nonacosene, 1-triacontene, 4-methyl-1-pentene, 3-methyl-1-pentene, 5-methyl-1-nonene, 3,5,5-trimethyl-1-hexene, vinylcyclohexane, and vinylnorbornane. Any of these alpha olefins may be used to form polyolefins (polyalphaolefins) in the disclosure herein.

In the present disclosure, ethylene shall be considered an alpha olefin.

The terms "aromatic," "aromatic group," or "aromatic hydrocarbon" refer to a hydrocarbon or hydrocarbyl group having a cyclic arrangement of delocalized, conjugated pi-electrons that satisfies the Hückel rule. The terms "heteroaryl," "heteroaryl group," or "heteroaromatic" refer to an aromatic ring containing a heteroatom and which satisfies the Hückel rule, such as an aryl group where a ring carbon atom (or two or three ring carbon atoms) has/have been replaced with a heteroatom, such as N, O, or S.

The term "aryl" is equivalent to the term "aromatic" as defined herein. The term "aryl" refers to both aromatic compounds and heteroaromatic compounds, which may be optionally substituted. Both mononuclear and polynuclear aromatic compounds are encompassed by these terms. As used herein, the term "aromatic" also refers to pseudoaromatic heterocycles, which are heterocyclic compounds having similar properties and structures (nearly planar) to aromatic heterocycles, but are not by definition aromatic. Examples of aryl groups include phenyl and naphthyl.

A substituted aryl is an aryl group in which at least one hydrogen atom of the aryl radical has been substituted with at least a non-hydrogen group, such as a hydrocarbyl group, a heteroatom or a heteroatom containing group, such as halogen (such as Br, Cl, F or I) or at least one functional group such as —NR*$_2$, —OR*, —SeR*, —TeR*, —PR*$_2$, —AsR*$_2$, —SbR*$_2$, —SR*, —BR*$_2$, —SiR*, —SiR*$_3$, —GeR*, —GeR*$_3$, —SnR*, —SnR*$_3$, —PbR*$_3$, and the like, where each R* is independently a hydrocarbyl or halocarbyl radical, and two or more R* may join together to form a substituted or unsubstituted saturated, partially unsaturated or aromatic cyclic or polycyclic ring structure, or where at least one heteroatom has been inserted within a hydrocarbyl ring. For example, 3,5-dimethylphenyl is a substituted aryl group.

The terms "substituted phenyl" and "substituted phenyl group" refer to a phenyl group having one or more hydrogen groups replaced by a hydrocarbyl, substituted hydrocarbyl, heteroatom or heteroatom containing group, such as halogen (such as Br, Cl, F or I) or at least one functional group such as —NR*$_2$, —OR*, —SeR*, —TeR*, —PR*$_2$, —AsR*$_2$, —SbR*$_2$, —SR*, —BR*$_2$, —SiR*, —SiR*$_3$, —GeR*, —GeR*$_3$, —SnR*, —SnR*$_3$, —PbR*$_3$, and the like, where each R* is independently a hydrocarbyl, halogen, or halocarbyl radical. Preferably the "substituted phenyl" group is represented by the formula

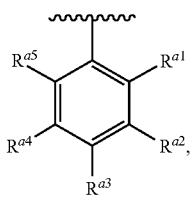

where each of $R^{a1}$, $R^{a2}$, $R^{a3}$, $R^{a4}$, and $R^{a5}$ is independently selected from hydrogen, $C_1$-$C_{40}$ hydrocarbyl or $C_1$-$C_{40}$ substituted hydrocarbyl, a heteroatom, such as halogen, or a heteroatom-containing group (provided that at least one of $R^{a1}$, $R^{a2}$, $R^{a3}$, $R^{a4}$, and $R^{a5}$ is not H), or a combination thereof.

A "fluorophenyl" or "fluorophenyl group" is a phenyl group substituted with one, two, three, four or five fluorine atoms. A "perfluorophenyl" or "perfluorophenyl group" is a phenyl group in which all aromatic ring hydrogen atoms have been substituted with fluorine atoms.

A "fluoronaphthyl" or "fluoronaphthyl group" is a naphthyl group substituted with one, two, three, four, five, six, or seven fluorine atoms. A "perfluoronaphthyl" or "perfluoronaphthyl group" is a naphthyl group in which all aromatic ring hydrogen atoms have been substituted with fluorine atoms.

The term "arylalkyl" refers to an aryl group where a hydrogen has been replaced with an alkyl group or substituted alkyl group. For example, 3,5'-di-tert-butylphenyl indenyl is an indene substituted with an arylalkyl group. When an arylalkyl group is a substituent on another group, it is bound to that group via the aryl.

The term "alkylaryl" refers to an alkyl group where a hydrogen has been replaced with an aryl group or substituted aryl group. For example, phenethyl indenyl is an indene substituted with an ethyl group bound to a phenyl group. When an alkylaryl group is a substituent on another group, it is bound to that group via the alkyl.

The term "aromatic solvent" refers to a solvent comprising one or more aromatic hydrocarbons.

The term "non-aromatic solvent" refers to a solvent comprising any compound that is not an aromatic hydrocarbon and the solvent being substantially devoid of an aromatic hydrocarbon.

The term "aliphatic hydrocarbon solvent" refers to a solvent comprising any alkane solvent and the solvent being substantially devoid of an aromatic hydrocarbon. Preferably, the aliphatic hydrocarbon solvent consists essentially of one or more alkane solvents.

Examples of saturated hydrocarbyl groups include, but are not limited to, alkyl groups such as methyl, ethyl, n-propyl, isopropyl, n-butyl, isobutyl, sec-butyl, tert-butyl, pentyl, iso-amyl (isopentyl), neopentyl, hexyl, octyl, cyclopropyl, cyclobutyl, cyclopentyl, cyclohexyl, cyclooctyl, and the like, including their substituted analogues. Examples of unsaturated hydrocarbyl groups include, but are not limited to, ethenyl, propenyl, allyl, butadienyl, cyclopropenyl, cyclobutenyl, cyclopentenyl, cyclohexenyl, cyclooctenyl and the like, including their substituted analogues.

The term "catalyst system" refers to the combination of a transition metal complex and at least one activator, or an activated reaction product form thereof. When used to describe such a combination before activation, the term "catalyst system" refers to the unactivated transition metal complex (precatalyst) together with the at least one activator (cocatalyst). When used to describe such a combination after activation, the term "catalyst system" refers to the activated complex and the at least one activator or other charge-balancing moiety. The transition metal complex may be neutral as in a precatalyst, or a charged species with a counter ion as in an activated catalyst system. For the purposes of this disclosure and the claims associated therewith, when catalyst systems are described as comprising neutral stable forms of the components, it is well understood by one of ordinary skill in the art that the ionic form of the component is the form that reacts with one or more monomers to produce a polymer or oligomer. A polymerization catalyst system is a catalyst system that can polymerize one or more monomers to form a polymer or oligomer containing the one or more monomers.

A scavenger is a compound typically added to a polymerization reaction to facilitate the reaction by scavenging impurities. Some scavengers may also act as activators and may be referred to as co-activators. A co-activator, that is not a scavenger, may be used in conjunction with an activator in order to form an activated catalyst. In some embodiments, a co-activator can be pre-mixed with a catalyst compound to form an alkylated catalyst compound.

A "solution polymerization" refers to a polymerization process in which the polymerization is conducted in a liquid polymerization medium, such as an inert solvent, preferably an aliphatic hydrocarbon solvent, or monomer(s) or their blends. A solution polymerization is typically homogeneous. A homogeneous polymerization is one where the polymer product and catalyst are each dissolved in the polymerization medium. Such systems are typically not turbid, as described in Oliveira, J. V. et al. (2000) "High-Pressure Phase Equilibria for Polypropylene-Hydrocarbon Systems," Ind. Eng. Chem. Res., v. 39(12), pp. 4627-4633.

A bulk polymerization refers to a polymerization process in which the monomers and/or comonomers being polymerized are used as a solvent or diluent using little or no inert solvent or diluent. A small fraction of inert solvent, preferably an aliphatic hydrocarbon solvent, may be used as a carrier for catalyst and scavenger, if desired. A bulk polymerization system contains less than about 25 wt % of inert solvent or diluent, such as less than about 10 wt %, or less than about 1 wt %, including 0 wt %.

A slurry polymerization process refers to any polymerization process in which a supported catalyst system is dispersed in a liquid medium, and polymer growth takes place heterogeneously on the supported catalyst system.

A gas phase polymerization process refers to any polymerization process in which a supported catalyst system is fluidized in a gas phase, and polymer growth takes place heterogeneously on the supported catalyst system.

The following abbreviations may be used through this specification: o-biphenyl is an ortho-biphenyl moiety represented by the structure

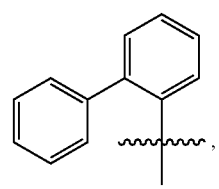 [SMILES: *c1ccccc1-c1ccccc1]

dme is 1,2-dimethoxyethane, Me is methyl, Ph is phenyl, Et is ethyl, Pr is propyl, iPr is isopropyl, n-Pr is normal propyl, cPr is cyclopropyl, Bu is butyl, iBu is isobutyl, tBu is tertiary butyl, p-tBu is para-tertiary butyl, nBu is normal butyl, sBu is sec-butyl, TMS is trimethylsilyl, TIBAL is triisobutylaluminum, TNOAL is tri(n-octyl)aluminum, MAO is methylalumoxane, p-Me is para-methyl, Ph is phenyl, Bn is benzyl (i.e., $CH_2Ph$), THF (also referred to as thf) is tetrahydrofuran, RT is room temperature (and is 23° C. unless otherwise indicated), tol is toluene, EtOAc is ethyl acetate, MeCy is methylcyclohexane, and Cy is cyclohexyl.

A "metallocene complex" or "metallocene catalyst" refers to organometallic compound with at least one π-bound cyclopentadienyl moiety or substituted cyclopentadienyl moiety (such as substituted or unsubstituted Cp, Ind, or Flu) and more frequently two (or three) π-bound cyclopentadienyl moieties or substituted cyclopentadienyl moieties (such as substituted or unsubstituted Cp, Ind, or Flu). (Cp=cyclopentadienyl, Ind=indenyl, Flu=fluorenyl). Two or more cyclopentadienyl moieties may be bridged together in a metallocene catalyst.

A "non-metallocene transition metal complex" refers to any transition metal complex that does not bear a cyclopentadienyl, indenyl, tetrahydroindenyl or fluorenyl group, or a substituted form thereof, bound to a transition metal.

The terms "alkoxy", "alkoxyl", and "alkoxide" refer to an alkyl ether or aryl ether radical, wherein the terms alkyl and aryl are as defined herein. Examples of alkyl ether radicals can include methoxy, ethoxy, n-propoxy, iso-propoxy, n-butoxy, iso-butoxy, sec-butoxy, tert-butoxy, phenoxy, and the like.

The terms "aryloxy" and "aryloxide" refer to an aryl ether radical, wherein the term aryl is as defined herein.

The term "ring atom" refers to an atom that is part of a cyclic ring structure. Accordingly, a benzyl group has six ring atoms and tetrahydrofuran has five ring atoms.

In the description herein, a catalyst may be described as a catalyst precursor, a pre-catalyst compound, a catalyst compound, a transition metal compound, or a transition metal complex, with terms being used interchangeably. A polymerization catalyst or polymerization catalyst system is a catalyst system that can polymerize one or more monomers into a polymer, preferably one or more olefinic monomers. Such catalyst systems may comprise a transition metal complex and at least one activator in the disclosure herein.

An "anionic ligand" is a negatively charged ligand which donates one or more pairs of electrons to a metal ion. A "neutral donor ligand" is a neutrally charged ligand which donates one or more pairs of electrons to a metal ion.

As used herein with respect to transition metal complexes, the term "amido" refers to an anionic (deprotonated) primary or secondary amine group that is bonded as a ligand to a transition metal. Carboxamides are distinct from amido groups (ligands) in the complexes of the present disclosure.

The term "catalyst productivity" refers to a measure of the mass of polymer produced using a known quantity of polymerization catalyst. Typically, "catalyst productivity" is expressed in units of (g of polymer)/(g of catalyst) or (g of polymer)/(mmols of catalyst) or the like. If units are not specified, then the "catalyst productivity" values herein are expressed in units of (g of polymer)/(grams of catalyst). For calculating catalyst productivity values, only the weight of the transition metal component of the catalyst system is used (i.e., the activator and/or co-catalyst is omitted).

The term "catalyst activity" refers to a measure of the mass of polymer produced using a known quantity of polymerization catalyst per unit time for batch and semi-batch polymerizations. For calculating catalyst activity values, only the weight of the transition metal component of the catalyst system is used (i.e., the activator and/or co-catalyst is omitted). Typically, "catalyst activity" values are expressed in units of (g of polymer)/(mmol of catalyst)/hour or (kg of polymer)/(mmols of catalyst)/hour or the like. If units are not specified then the "catalyst activity" values herein are express in units of (g of polymer)/(mmol of catalyst)/hour.

The term "conversion" refers to the percentage of a monomer that is converted to polymer product in a polymerization, and is reported as mol % and is calculated based on the polymer yield, the polymer composition, and the amount of monomer fed into the reactor.

The term "continuous" refers to a system that operates without interruption or cessation for a period of time, such as where reactants are continually fed into a reaction zone and products are continually or regularly withdrawn without stopping the reaction in the reaction zone. For example, a continuous process to produce a polymer is one where the reactants are continually introduced into one or more reactors and polymer product is continually withdrawn.

Catalyst Solutions and Catalyst Systems

Accordingly, the present disclosure provides catalyst solutions containing enhanced concentrations of non-metallocene transition metal complexes, catalyst systems formed from the catalyst solutions, and methods for polymerizing olefins using the catalyst systems, wherein the presence of aromatic solvents, such as toluene, is eliminated or substantially minimized therein. In particular, solutions (e.g., catalyst solutions) formed according to the present disclosure may comprise a non-metallocene transition metal complex dissolved in an aliphatic hydrocarbon solvent at a concentration above 2 mM at 23° C., preferably a concentration ranging from about 2 mM to about 20 mM at 23° C., or more preferably a concentration ranging from about 2 mM to about 10 mM at 23° C., in the presence of an organoaluminum compound. A molar ratio of aluminum of the organoaluminum compound to transition metal of the non-metallocene transition metal complex is about 1:1 or greater (i.e., a stoichiometric amount or higher amount of the organoaluminum compound is present relative to the non-metallocene transition metal complex), and the organoaluminum compound comprises at least about 8 carbons per aluminum. The non-metallocene transition metal complex has an aliphatic hydrocarbon solubility of less than 2 mM in an absence of the organoaluminum compound, preferably an aliphatic hydrocarbon solubility of about 0.1 mM to about 1.5 mM at 23° C. in a specified aliphatic hydrocarbon solvent. Examples of suitable non-metallocene transition metal complexes for use in the disclosure herein are provided below. Preferably, the solutions and catalyst systems formed therefrom comprise at most about 5 ppm toluene or other aromatic solvent, and more preferably, are free of toluene or other aromatic solvents, wherein free of toluene or other aromatic solvents refers to there being no detectable toluene or other detectable aromatic solvents present. For purposes of the present disclosure, "detectable aromatic solvent" means 0.1 mg/m$^2$ or more as determined by gas phase chromatography. For purposes of the present disclosure, "detectable toluene" means 0.1 mg/m$^2$ or more as determined by gas chromatography.

Without being limited by theory or mechanism, the non-metallocene transition metal complex and the organoaluminum compound may form an adduct or a reaction product once contacted with each other in the aliphatic hydrocarbon solvent. Adducts may comprise a physical association of the non-metallocene transition metal complex and the organoaluminum compound, wherein the adduct exhibits improved solubility in comparison to the non-metallocene transition metal complex alone. Adducts may be formed reversibly or irreversibly. Reaction products may similarly be formed reversibly or irreversibly and entail a chemical change or transformation taking place upon the non-metallocene transition metal complex, wherein the reaction products likewise exhibit enhanced solubility in comparison to the non-metallocene transition metal complex alone. Remaining unbound by any theory or mechanism, reaction products for promoting solubility of non-metallocene transition metal complexes according to the disclosure herein may be formed by transfer of an alkyl group from the organoaluminum compound to the non-metallocene transition metal complex, wherein the alkyl group is sufficiently hydrophobic to enhance solubility in aliphatic hydrocarbon solvents. In non-limiting examples, an alkyl group bound to the transition metal of the non-metallocene transition metal complex may be exchanged for a larger alkyl group.

The catalyst solutions of the present disclosure may feature a concentration of the non-metallocene transition metal complex that is higher than that achieved in an absence of the organoaluminum compound. The catalyst solutions may also feature a concentration of the non-metallocene transition metal complex that remains in a range suitable to allow ready handling and dispensation of the catalyst solution, such as through using high-pressure pumps conventionally used in solution-phase polymerization reactions. As such, it can be desirable for the concentration of the non-metallocene transition metal complex of the catalyst solution to reside within a range from about 2 mM to about 20 mM, with the lower concentration representing a concentration value higher than that of the non-metallocene transition metal complex by itself (i.e., in an absence of the organoaluminum compound) and the higher concentration representing an effective concentration limit, above which dispensation of the catalyst solution may become problematic. High concentrations larger than 20 nM at 23° C. are also possible in some instances to provide a catalyst solution concentrate. The concentrate may then be diluted into a preferred concentration range, if needed, prior to conducting a polymerization reaction. Preferably, the concentration of the non-metallocene transition metal complex within the catalyst solutions may range from about 3 mM to about 6 mM, or from about 5 mM to about 10 mM, or from about 2 mM to about 12 mM.

In the catalyst solutions described herein, aluminum of the organoaluminum compound is present in at least a stoichiometric amount with respect to transition metal of the non-metallocene transition metal complex, such that a molar ratio of aluminum to transition metal is about 1:1 or greater. The molar ratio of aluminum to transition metal may suitably range from about 1:1 up to about 1.1:1, or up to about 1.2:1, or up to about 1.4:1, or up to about 1.6:1, or up to about 1.8:1, or up to about 2:1, or up to about 2.5:1, or up to about 3:1, or up to about 4:1, or up to about 5:1, or up to about 6:1, or up to about 7:1, or up to about 8:1, or up to about 9:1, or up to about 10:1, or up to about 15:1, or up to about 20:1, or up to about 25:1, or up to about 30:1, or up to about 35:1, or up to about 40:1, or up to about 45:1, or up to about 50:1, or up to about 60:1, or up to about 70:1, or up to about 80:1, or up to about 90:1, or up to about 100:1. Preferably, the molar ratio of aluminum of the organoaluminum compound to transition metal of the non-metallocene transition metal complex may range from about 1:1 to about 10:1, or from about 1:1 to about 5:1, or from about 1:1 to about 4:1, or from about 1:1 to about 3:1.

The organoaluminum compound may be present in an aliphatic hydrocarbon solvent before a non-metallocene transition metal complex is contacted with the solvent to form the catalyst solutions disclosed herein. Alternately, the non-metallocene transition metal complex may be slurried in an aliphatic hydrocarbon solvent above a solubility limit thereof, and the organoaluminum compound may then be combined therewith, with sufficient organoaluminum compound being added until solubilization of the non-metallocene transition metal complex occurs. In other instances, an excess of organoaluminum compound beyond that sufficient for promoting solubility may be added to the aliphatic hydrocarbon solvent. Excess organoaluminum compound may, for example, promote scavenging during a polymerization reaction, for example.

Suitable organoaluminum compounds may comprise at least about 8 carbons per aluminum, preferably at least about 12 carbons per aluminum, and more preferably at least about 16 carbons per aluminum. Organoaluminum compounds may comprise at least one alkyl group containing the foregoing number of carbons, preferably two alkyl groups or three alkyl groups collectively containing the foregoing number of carbons, with the alkyl groups present in a given organoaluminum compound being the same or different and/or containing the same or a different number of carbons in each alkyl group. Preferably, the organoaluminum compound may comprise two or more alkyl groups, wherein the two or more alkyl groups are each $C_3$ or larger, preferably each $C_4$ or larger, more preferably each $C_6$ or larger, and still more preferably each $C_8$ or larger. Thus, particular organoaluminum compounds suitable for use in the disclosure herein may comprise at least one alkyl group having from 3 carbons to about 30 carbons, or about 3 carbons to about 20 carbons, or about 3 carbons to about 16 carbons, or about 4 carbons to about 20 carbons, or about 6 carbons to about 20 carbons, or about 8 carbons to about 20 carbons, or about 10 carbons to about 20 carbons, or about 12 carbons to about 20 carbons, or about 14 carbons to about 20 carbons, or about 4 carbons to about 24 carbons, or about 6 carbons to about 24 carbons, or about 8 carbons to about 24 carbons, or about 10 carbons to about 24 carbons, or about 12 carbons to about 24 carbons, or about 14 carbons to about 24 carbons, or about 16 carbons to about 24 carbons, or about 16 carbons to about 30 carbons. Still more preferably, the organoaluminum compound may comprise two or three alkyl groups that are each $C_3$ or larger, preferably each $C_4$ or larger, more preferably each $C_6$ or larger, and still more preferably each $C_8$ or larger. The alkyl groups in any of the organoaluminum compounds used herein may be linear, branched, cyclic, or any combination thereof. Mixtures of two or more organoaluminum compounds may also be suitably used in the disclosure herein.

Organoaluminum compounds suitable for solubilizing non-metallocene transition metal complexes according to the disclosure herein may comprise at least one alkylaluminum compound, such as a trialkylaluminum, a bis(dialkylaluminum) oxide, a dialkylaluminum hydride, or any combination thereof. Such alkylaluminum compounds may comprise alkyl groups that are the same or different, wherein different alkyl groups may differ isomerically and/or in the number of carbons contained therein. Preferable alkylaluminum compounds may comprise alkyl groups that are $C_3$ or larger, preferably $C_4$ or larger, more preferably $C_6$ or larger, and still more preferably $C_8$ or larger.

Other alkylaluminum compounds that may be suitable for use in promoting increased solubility according to the disclosure herein include, for example, dialkylaluminum alkoxides, alkylaluminum bisalkoxides, aluminum trisalkoxides, dialkylaluminum halides, alkylaluminum dihalides, and the like. Illustrative alkylaluminum compounds of these types that may be suitable include, for example, diethyl aluminum n-butoxide, diethyl aluminum isobutoxide, diisobutyl aluminum methoxide, diisobutyl aluminum ethoxide, diisobutyl aluminum isopropoxide, diisobutyl aluminum n-butoxide, diisobutyl aluminum isobutoxide, di-n-hexyl aluminum methoxide, di-n-hexyl aluminum ethoxide, di-n-hexyl aluminum isopropoxide, di-n-hexyl aluminum n-butoxide, di-n-hexyl aluminum isobutoxide, methyl aluminum dimethoxide, methyl aluminum diethoxide, methyl aluminum diisopropoxide, methyl aluminum di-n-butoxide, methyl aluminum diisobutoxide, ethyl aluminum dimethoxide, ethyl aluminum diethoxide, ethyl aluminum diisopropoxide, ethyl aluminum di-n-butoxide, ethyl aluminum diisobtutoxide, isobutyl aluminum dimethoxide, isobutyl aluminum diethoxide, isobutyl aluminum diisopropoxide, isobutyl aluminum di-n-butoxide, isobutyl aluminum diisobutoxide, n-hexylaluminum dimethoxide, n-hexyl aluminum diethoxide, n-hexyl aluminum diisopropoxide, n-hexyl aluminum di-n-butoxide, n-hexyl aluminum diisobutoxide, aluminum trimethoxide, aluminum triethoxide, aluminum triisopropoxide, aluminum tri-n-butoxide, tetramethyldialuminumdiiso-propoxide, tetramethyldialuminumdi-tert-butoxide, tetramethyldialuminumditert-butoxide, pentamethyldialuminumtert-butoxide, and aluminum triisobutoxide. These and similar organoaluminum compounds may be used singularly, in combination, or in combination with one or more trialkylaluminums, bis(dialkylaluminum) oxides, or dialkylaluminum hydrides.

Specific examples of suitable organoaluminum compounds for solubilizing non-metallocene transition metal complexes according to the disclosure herein may include, but are not limited to, tri-n-propylaluminuum, triisopropylaluminum, tri-n-butylaluminum, triisobutylaluminum, tri-n-pentylaluminum, tri(2-methylpentyl)aluminum, tri-n-hexylaluminum, tri-n-octylaluminum, tri-n-decylaluminum, bis(di-n-butylaluminum oxide), bis(diisobutylaluminum) oxide, bis(di-n-pentylaluminum) oxide, bis(di-n-hexylaluminum) oxide, bis(di-n-octylaluminum) oxide, di-n-butylaluminum hydride, diisobutylaluminum hydride, di-n-pentylaluminum hydride, di-n-hexylaluminum hydride, di-n-octylaluminum hydride, and di-n-decylaluminum hydride.

Aliphatic hydrocarbon solvents suitable for forming the catalyst solutions and catalyst systems disclosed herein are not believed to be particularly limited, provided that the aliphatic hydrocarbon solvent is not excessively volatile or excessively high boiling and is capable of solubilizing the non-metallocene transition metal complex at a concentration of about 2 mM or higher, preferably a concentration up to about 20 mM. Preferably, suitable aliphatic hydrocarbon solvents may have a boiling point of about 120° C. or below at atmospheric pressure, more preferably a boiling point of about 90° C. or below at atmospheric pressure. Suitable aliphatic hydrocarbons may be linear, branched, cyclic or branched cyclic, or any combination thereof. Particularly suitable aliphatic hydrocarbons may comprise 9 or fewer carbons, preferably 5 to 9 carbons, 6 to 9 carbons, 7 to 9 carbons, or 5 to 7 carbons. Particularly suitable aliphatic hydrocarbons for use in the disclosure herein may include isopentane, hexane, isohexane, n-heptane, octane, nonane, and cycloalkanes, such as cyclohexane, cyclopentane, and methylcyclopentane. More specific examples of suitable aliphatic hydrocarbon solvents include ISOPAR C (a mixture of $C_7$ and $C_8$ isoparaffins) and ISOPAR E (a mixture of $C_8$ and $C_9$ isoparaffins), each of which is available from ExxonMobil Chemical Company. Methylcyclohexane and/or isohexane may be especially preferable aliphatic hydrocarbon solvents for use in the disclosure herein.

Catalyst solutions and catalyst systems of the present disclosure may comprise a minimal amount of aromatic solvent, such as toluene in some process implementations. When present, the catalyst solutions and catalyst system may comprise at most about 5 ppm aromatic solvent. Preferably, the catalyst solutions and catalyst systems of the present disclosure may be substantially free of aromatic solvent. In some instances, the catalyst solutions may consist essentially of the non-metallocene transition metal complex and the aliphatic hydrocarbon solvent.

Suitable non-metallocene transition metal complexes for use in the disclosure herein may have a general formula of $LM(X)_2$, wherein L is a dianionic ligand that coordinates to transition metal M in a tridentate or tetradentate fashion, and X is an anionic group containing six or fewer non-hydrogen atoms, or two Xs may be joined to form a ring, which may be a chelating ligand, a diene ligand, or an alkylidene ligand. Preferably, X is a $C_1$-$C_6$ hydrocarbyl group, more preferably methyl. Polydentate coordination of the transition metal is thought to increase the stability of the complex toward unwanted chemistry, such as decomposition or transmetalation with the organoaluminum compound, once the complex has been combined with the organoaluminum compound according to the disclosure herein.

Preferably, at least one donor atom in L is a nitrogen donor or an oxygen donor, either of which may form an anion suitable for coordinating the transition metal when deprotonated. L may be a dianionic tridentate ligand with at least two of the donor groups being nitrogen or phosphorous donors. L may be a dianionic tridentate ligand with all of the donor groups being nitrogen or oxygen donors. L may be a dianionic tetradentate ligand with all four donor groups being oxygen or sulfur donors. L may be a dianionic tetradentate ligand with two Group 15 donors and two Group 16 donors. L may be a dianionic tetradentate ligand with at least two donor groups being oxygen donors.

Suitable Xs in the non-metallocene transition metal complexes include hydrocarbyl groups (e.g., $C_1$-$C_{20}$ alkyls), hydrides, halogens, alkoxides, sulfides, phosphides, phosphines, dienes, amines, amides, ethers, carboxylates, alkylsulfonates, and any combination thereof. Specific examples of suitable hydrocarbyl Xs may include methyl, ethyl, propyl, butyl, chloro, bromo, fluoro, dimethylamido, diethylamido, and tert-butoxy. More preferably, each X is a $C_1$-$C_6$ hydrocarbyl. Most preferably, each X is a methyl group.

Suitable non-metallocene transition metal complexes do not include a cyclopentadienyl anion or substituted cyclopentadienyl anion donors (e.g., cyclopentadienyl, fluorenyl, indenyl, methylcyclopentadienyl). Preferable non-metallocene transition metal complexes suitable for use in the disclosure herein may comprise a transition metal from Groups 3-12 of the Periodic Table, preferably from Groups 3-6 of the Periodic Table, and have an isohexane solubility (in an absence of an organoaluminum compound) of about 2 mM or less at 23° C. and 760 torr, particularly a solubility of about 0.1 mM to about 1.9 mM or about 0.1 mM to about 1.5 mM at 23° C. and 760 torr.

Group 3 through Group 10 transition metals suitable for use in the transition metal complexes may be selected from Cr, Sc, Ti, Zr, Hf, V, Nb, Ta, Mn, Re, Fe, Ru, Os, Co, Rh, Ir, and Ni. Preferably, the transition metal complex may comprise a Group 4 transition metal (Ti, Zr, or Hf), preferably a pyridyldiamide or a quinolinyldiamide complex, as specified further below. The oxidation state of the transition metal in the transition metal complexes may range from 0 to +7, for example +1, +2, +3, +4, or +5, for example +2, +3, or +4. Non-metallocene transition metal complexes with M being a third-row transition metal may be preferred because the resulting solutions are anticipated to have better stability due to a reduced tendency of third-row metal alkyls to undergo undesirable chemistry (e.g., beta hydride elimination, bond homolysis, reductive elimination, and the like).

Particularly suitable non-metallocene transition metal complexes that may have their solubility enhanced according to the disclosure herein may include at least one of a pyridyldiamine, a quinolinoyldiamide, a bis(phenolate), a heterocyclic diamide, or any combination thereof, preferably those containing a $C_1$-$C_6$ hydrocarbyl group as an anionic ligand, more preferably a methyl group as an anionic ligand. Suitable pyridyldiamides may include, but are not limited to, those described in more detail in U.S. Pat. Nos. 8,592,615, 7,973,116 and 6,900,321 and US Patent Application Publications 2012/0071616, 2011/0224391, 2011/0301310, and 2015/0141601, each incorporated herein by reference. Suitable quinolinoyldiamides may include, but are not limited to, those described in more detail in US Patent Application Publication 2018/0002352, incorporated herein by reference. Suitable bis(phenolates) may include, but are not limited to, those described in more detail in U.S. Pat. No. 6,841,502 and International Patent Application Publications WO 2012/027448, WO 2017/004462, WO 2006/020624, WO 2016/153682, and WO 2018/022279, each incorporated herein by reference. Suitable heterocyclic amides may include, but are not limited to, those described in U.S. Pat. Nos. 7,018,949 and 7,256,296, Diamond, et al., ACS Catal., 2011, pp. 887-900, 1, and Boussie, et al., Angew. Chem. Int. Ed. Engl. 2006, p. 3278, 45, each incorporated herein by reference. Additional structural details of these and other transition metal complexes suitable for use in the present disclosure are provided below.

Particularly suitable non-metallocene transition metal complexes that may have their solubilty enhanced according to the disclosure herein include bis(phenolate) complexes supported by tridentate bis(phenolate) ligands such as those described in US patent applications US 2020/0255553, US 2020/0254431, US 2020/0255555, and US 2020/0255556.

Other types of transition metal complexes that may be suitable for use in the disclosure herein include, for example, late transition metal pyridylbisimines (e.g., U.S. Pat. No. 7,087,686), pyridylamidos (e.g., U.S. Pat. No. 7,087,690), phenoxyimines (e.g., Makio, H. et al. "Development and Application of FI Catalysts for Olefin Polymerization: Unique Catalysis and Distinctive Polymer Formation," Accounts of Chemical Research, 2009, 42(10), pp. 1532-1544), and bridged bi-aromatic complexes (e.g., U.S. Pat. No. 7,091,292), oxadiazolylphenolate complexes; oxybis(ethylamine) complexes; benzazole and pseudoindole complexes, and the like, again preferably those containing a $C_1$-$C_6$ hydrocarbyl group as an anionic ligand, more preferably a methyl group as an anionic ligand.

Suitable pyridyldiamido complexes feature a dianionic tridentate ligand that is coordinated to a transition metal through one neutral Lewis base donor atom (e.g., a pyridine group) and a pair of anionic amido or phosphido (i.e., deprotonated amine or phosphine groups) donors. The pyridyldiamido ligand may be coordinated to the transition metal with the formation of one five-membered chelate ring and one seven-membered chelate ring. It is possible for additional atoms of the pyridyldiamido ligand to be coordinated to the transition metal without affecting the catalytic function upon activation; an example of this type could be a cyclometalated substituted aryl group that forms an additional bond to the transition metal.

Suitable pyridyldiamido complexes may have a structure represented by Formula (1)

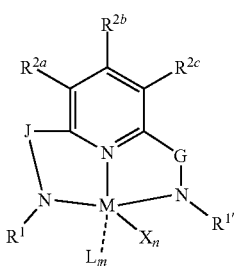

Formula (1)

wherein M is a transition metal, preferably a Group 4 transition metal; $R^{2a}$, $R^{2b}$, and $R^{2c}$ are independently hydrogen, an optionally substituted hydrocarbyl, alkoxy, aryloxy, halogen, amino, or silyl group; L is an optional neutral ligand, with two L optionally being joined together to form a bidentate neutral ligand; m is an integer ranging from 0 to 3; X is an anionic group, with two X optionally being joined together to form a dianionic group; n is 1 or 2, wherein a sum of m+n is 4 or less (preferably X is a $C_1$-$C_6$ hydrocarbyl group, more preferably a methyl group); J is a linker group contributing three atoms that are located within a first chelate ring (a 7-membered chelate ring); G is a linker group contributing one atom located within a second chelate ring (a 5-membered chelate ring), such as a hydrocarbyl group, silylcarbyl, or germacarbyl group, preferably a hydrocarbyl group; and $R^1$ and $R^{1'}$ are independently selected from the group consisting of a hydrocarbyl group and a trihydrocarbylsilyl group, preferably an aryl group. Optionally, $R^{2a}$ and $R^{2b}$ or $R^{2b}$ and $R^{2c}$ may be joined to form a carbocyclic ring fused to the pyridine ring. Particular examples of linker group J include those represented by the structures below

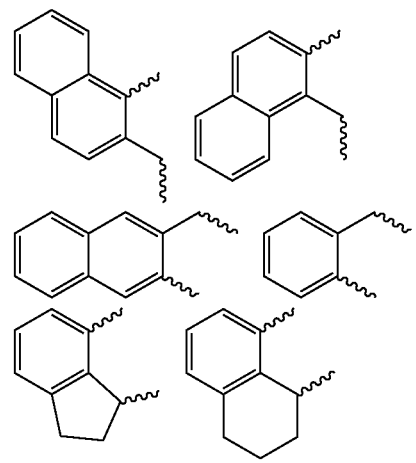

wherein each wavy bond represents a point of connectivity to another atom in the first chelate ring.

A particularly suitable pyridyldiamido transition metal complex may have a structure represented by Formula (2)

Formula (2)

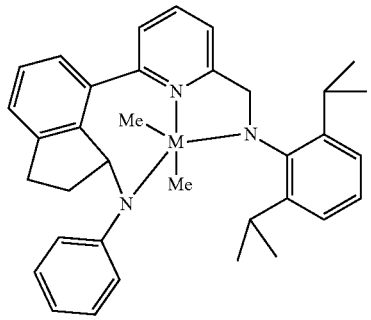

wherein M is a transition metal, preferably Zr or Hf, more preferably Hf.

Quinolinoyldiamido complexes may be structurally similar to pyridyldiamido complexes, except feature a quinolinyl moiety instead of a pyridyl moiety. Suitable quinolinyldiamido complexes may have a structure represented by Formula (3), Formula (3)

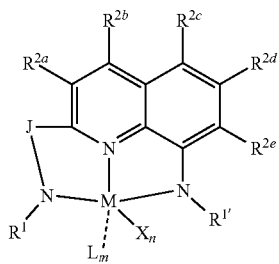

wherein $R^{2a}$, $R^{2b}$, $R^{2c}$, $R^{2d}$, and $R^{2e}$ are independently hydrogen, an optionally substituted hydrocarbyl, alkoxy, aryloxy, halogen, amino, or silyl group, and the other variables are defined as above for pyridyldiamido complexes. Optionally, $R^{2a}$ and $R^{2b}$, $R^{2b}$ and $R^{2c}$, $R^{2c}$ and $R^{2d}$, or $R^{2d}$ and $R^{2e}$ may be joined to form a carbocyclic ring fused to the quinoline ring.

A particularly suitable quinolinyldiamido transition metal complex may have a structure represented by Formula (4)

Formula (4)

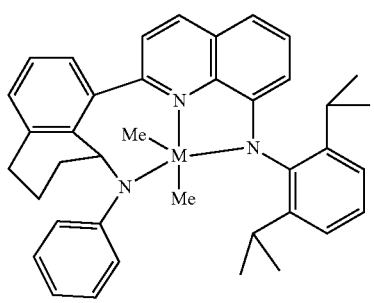

wherein M is a transition metal, preferably Zr or Hf, more preferably Hf.

Bis(phenolate) complexes refer refers to a class of transition metal complexes that feature a dianionic tetradentate ligand that is coordinated to a transition metal through two neutral Lewis base donor atoms (e.g., oxygen bridge moieties) and two anionic aryloxy (i.e., deprotonated phenoxy) donors and to two other anionic ligands.

In at least one embodiment, suitable bis(phenolate) complexes may have a structure represented by Formula (5)

Formula (5)

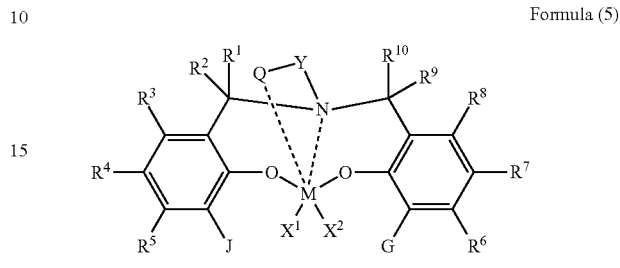

wherein M is a Group 4 transition metal, such as Hf or Zr; $X^1$ and $X^2$ are independently a univalent $C_1$-$C_{20}$ hydrocarbyl, $C_1$-$C_{20}$ substituted hydrocarbyl, a heteroatom or a heteroatom-containing group, or $X^1$ and $X^2$ join together to form a $C_4$-$C_{62}$ cyclic or polycyclic ring structure (preferably $X^1$ and $X^2$ are $C_1$-$C_6$ hydrocarbyl groups, more preferably methyl groups); $R^1$, $R^2$, $R^3$, $R^4$, $R^5$, $R^6$, $R^7$, $R^8$, $R^9$, and $R^{10}$ are independently hydrogen, $C_1$-$C_{40}$ hydrocarbyl, $C_1$-$C_{40}$ substituted hydrocarbyl, a heteroatom or a heteroatom-containing group, or two or more of $R^1$, $R^2$, $R^3$, $R^4$, $R^5$, $R^6$, $R^7$, $R^8$, $R^9$, or $R^{10}$ are joined together to form a $C_4$-$C_{62}$ cyclic or polycyclic ring structure, or a combination thereof; Q is a neutral donor group; J is heterocycle, or a substituted or unsubstituted $C_7$-$C_{60}$ fused polycyclic group, where at least one ring is aromatic and where at least one ring, which may or may not be aromatic, has at least five ring atoms, G is as defined as for J or may be hydrogen, $C_2$-$C_{60}$ hydrocarbyl, $C_1$-$C_{60}$ substituted hydrocarbyl, or may independently form a $C_4$-$C_{60}$ cyclic or polycyclic ring structure with $R^6$, $R^7$, or $R^8$ or a combination thereof; Y is a divalent $C_1$-$C_{20}$ hydrocarbyl or divalent $C_1$-$C_{20}$ substituted hydrocarbyl or (-Q-Y—) together form a heterocycle; and the heterocycle may be aromatic and/or may have multiple fused rings.

Particularly suitable bis(phenolate) complexes may be represented by Formulas (5A) or (5B)

Formula (5A)

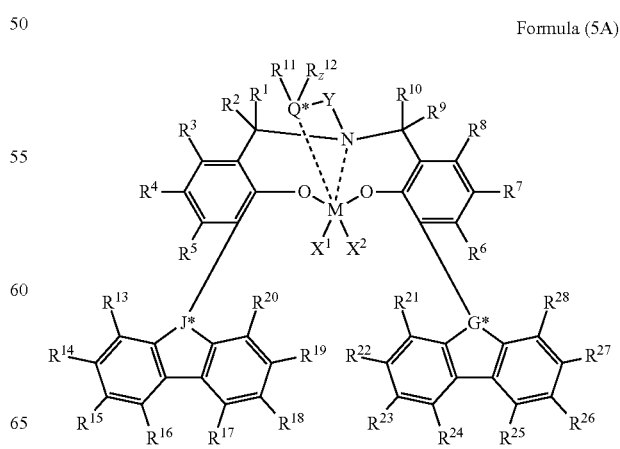

Formula (5B)

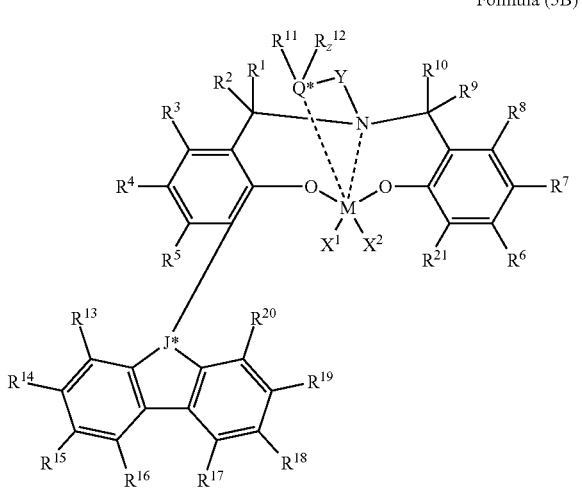

wherein M is Hf, Zr, or Ti; $X^1$, $X^2$, $R^1$, $R^2$, $R^3$, $R^4$, $R^5$, $R^6$, $R^7$, $R^8$, $R^9$, $R^{10}$ and Y are as defined for Formula (4); $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, and $R^{28}$ are independently a hydrogen, $C_1$-$C_{40}$ hydrocarbyl, $C_1$-$C_{40}$ substituted hydrocarbyl, a functional group comprising elements from Groups 13 to 17, or two or more of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, and $R^{28}$ may independently join together to form a $C_4$-$C_{62}$ cyclic or polycyclic ring structure, or a combination thereof; $R^{11}$ and $R^{12}$ may join together to form a five- to eight-membered heterocycle; Q* is a Group 15 or 16 atom; z is 0 or 1; J* is CR" or N, and G* is CR" or N, where R" is $C_1$-$C_{20}$ hydrocarbyl or carbonyl-containing $C_1$-$C_{20}$ hydrocarbyl; and z=0 if Q* is a group 16 atom, and z=1 if Q* is a Group 15 atom.

Still other suitable bis(phenolate) complexes may be represented by Formula (5C)

Formula (5C)

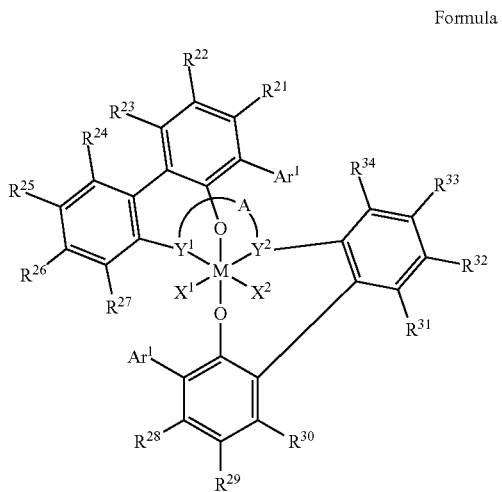

wherein:

M is a group 3, 4, 5, 6, 7, 8, 9, 10, 11, or 12 metal, such as a group 4 metal, preferably Hf or Zr;

$R^{21}$, $R^{22}$, $R^{23}$, $R^{24}$, $R^{25}$, $R^{26}$, $R^{27}$, $R^{28}$, $R^{29}$, $R^{30}$, $R^{31}$, $R^{32}$, $R^{33}$ and $R^{34}$ are independently hydride, halide, optionally substituted hydrocarbyl, heteroatom-containing optionally substituted hydrocarbyl, alkoxy, aryloxy, silyl, boryl, dialkyl amino, alkylthio, arylthio, and seleno, preferably hydride or alkyl; optionally two or more R groups can combine together into ring structures with such ring structures having from 3 to 100 non-hydrogen atoms in the ring;

A is a $C_1$-$C_{50}$ alkyl group;

$Y^1$ and $Y^2$ are independently selected from O, S, $NR^a$, and $PR^a$ wherein $R^a$ is optionally substituted hydrocarbyl, preferably $Y^1$ and $Y^2$ are O;

$Ar^1$ is phenyl, naphthyl, biphenyl, anthracenyl, or phenanthrenyl; and $X^1$ and $X^2$ are, independently, hydrogen, halogen, hydrocarbyl, substituted hydrocarbyl, halocarbyl, substituted halocarbyl, silyl, silylcarbyl, substituted silylcarbyl, germylcarbyl, substituted germylcarbyl, aryl, substituted aryl, alkylaryl, heteroaryl, substituted heteroaryl, alkoxy, substituted alkoxy, aryloxy, substituted aryloxy, boryl, amino, phosphino, ether, thioether, phosphine, amine, carboxylate, alkylthio, arylthio, 1,3-dionate, oxalate, carbonate, nitrate, or sulphate, or both $X^1$ and $X^2$ are joined and bound to the metal atom to form a metallacycle ring containing from about 3 to about 20 carbon atoms; or both together can be an olefin, diolefin, or aryne ligand (preferably $X^1$ and $X^2$ are $C_1$-$C_6$ hydrocarbyl groups, more preferably methyl groups).

Some bis(phenolate) transition metal complexes having catalytic activity may have a structure represented by Formulas (6A) and (6B).

Formula (6A)

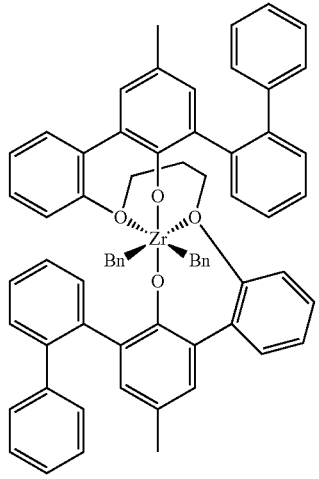

Formula (6B)

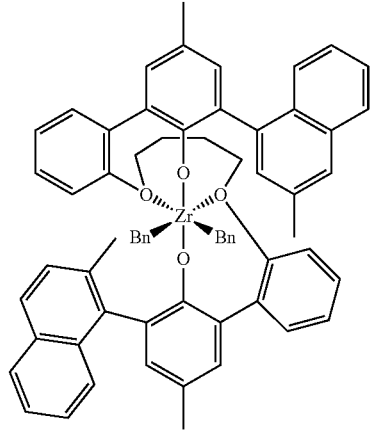

Illustrative heterocyclic amide transition metal complexes may have structures represented by Formulas (7A) and (7BA)

Formula (7A)

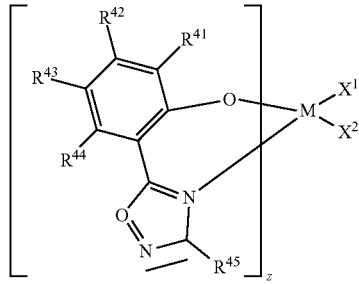

Formula (7A)

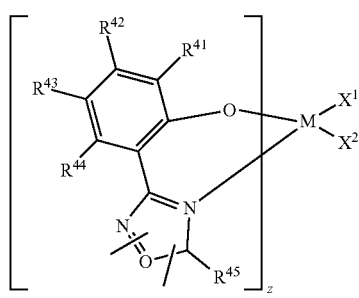

wherein:

M is an element selected from group 4 of the Periodic Table of the Elements, preferably Zr or Hf;

$R^{41}$, $R^{42}$, $R^{43}$, $R^{44}$, and $R^{45}$ are independently selected from the group consisting of hydrogen, alkyl, substituted alkyl, cycloalkyl, substituted cycloalkyl, heteroalkyl, substituted heteroalkyl, heterocycloalkyl, substituted heterocycloalkyl, aryl, substituted aryl, heteroaryl, substituted heteroaryl, alkoxy, aryloxy, halo, silyl, boryl, phosphino, amino, thioalkyl, thioaryl, nitro, and combinations thereof, preferably hydride, alkyl or aryl;

$X^1$ and $X^2$ are, independently, hydrogen, halogen, hydrocarbyl, substituted hydrocarbyl, halocarbyl, substituted halocarbyl, silyl, silylcarbyl, substituted silylcarbyl, germylcarbyl, substituted germylcarbyl, aryl, substituted aryl, heteroaryl, substituted heteroaryl, alkoxy, substituted alkoxy, aryloxy, substituted aryloxy, boryl, amino, phosphino, ether, thioether, phosphine, amine, carboxylate, alkylthio, arylthio, 1,3-dionate, oxalate, carbonate, nitrate, or sulphate, or both $X^1$ and $X^2$ are joined and bound to the metal atom to form a metallacycle ring containing from about 3 to about 20 carbon atoms; or both together can be an olefin, diolefin, or aryne ligand (preferably $X^1$ and $X^2$ are $C_1$-$C_6$ hydrocarbyl groups, more preferably methyl groups); and z is 1, 2, 3, or 4.

Illustrative heterocyclic amide transition metal complexes having catalytic activity may have a structure represented by Formula (8).

Formula (8)

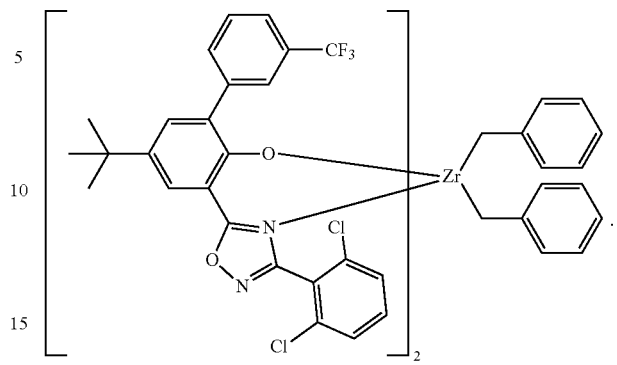

Two or more different transition metal complexes may be present in the catalyst solutions and catalyst systems disclosed herein. In some embodiments, two or more different transition metal complexes are present in the reaction zone where the process(es) described herein occur. When two transition metal complexes are used in one reactor as a mixed catalyst system, the two transition metal compounds are preferably chosen such that the two are compatible. A simple screening method such as by $^1$H or $^{13}$C NMR, known to those of ordinary skill in the art, can be used to determine which transition metal complexes are compatible. It is preferable to use the same activator for the transition metal complexes, however, two different activators can be used in combination, if desired.

The two transition metal complexes may be used in any ratio. Preferred molar ratios of (A) transition metal complex to (B) transition metal complex fall within the range of (A:B) 1:1000 to 1000:1, alternatively 1:100 to 500:1, alternatively 1:10 to 200:1, alternatively 1:1 to 100:1, and alternatively 1:1 to 75:1, and alternatively 5:1 to 50:1. The particular ratio chosen will depend on the exact transition metal complexes chosen, the method of activation, and the end product desired. In a particular embodiment, when using the two different transition metal complexes, where both are activated with the same activator, useful mole percents, based upon the molecular weight of the complexes, are 10 to 99.9% A to 0.1 to 90% B, alternatively 25 to 99% A to 0.5 to 50% B, alternatively 50 to 99% A to 1 to 25% B, and alternatively 75 to 99% A to 1 to 10% B.

Catalyst systems of the present disclosure may comprise any of the catalyst solutions disclosed herein and at least one activator effective to activate the non-metallocene transition metal complex, specifically activation of the non-metallocene transition metal complex into a form suitable for promoting an olefin polymerization reaction. A reaction product of the transition metal complex and the at least one activator may be present in the catalyst systems upon combination of these two components.

As used concerning a catalyst system, the term "reaction product" refers to an activated form of the transition metal complex that is effective for promoting olefin polymerization or oligomerization. Without being bound by any theory or mechanism, the activator may react with the transition metal complex to promote loss of an anionic ligand (i.e., at least one X) to open a coordination site, at which polymerization of an olefin may occur.

The typical activator-to-complex molar ratio may be from about 0.1:1 to about 100:1, alternately from about 0.5:1 to about 200:1, alternately from about 1:1 to about 500:1, or alternately from about 1:1 to about 1000:1. A particularly useful molar ratio range may be from about 0.5:1 to about 10:1, preferably from about 1:1 to about 5:1, and more preferably about 1:1.

In any embodiment of the present disclosure, suitable activators for the non-metallocene transition metal complexes may comprise an alumoxane. Suitable alumoxanes are not considered especially limited, provided they allow a polymer or oligomer to form upon contacting the activated transition metal complex with a polymerizable monomer, such as one or more alpha olefins, as described herein. Methylalumoxane (MAO) may be an especially suitable alumoxane for use in combination with the non-metallocene transition metal complexes disclosed herein.

When the activator is an alumoxane, the molar ratio of alumoxane to transition metal complex (per metal catalytic site) (Al:M) may be from about 1:1 to about 500:1, or from about 1:1 to about 200:1 (Al:M), or from about 1:1 to about 100:1 (Al:M), or from about 1:1 to about 50:1 (Al:M).

Other suitable activators for the non-metallocene transition metal complexes may include compounds containing a non-coordinating anion, especially borane and borate compounds. Particularly useful borane and borate compounds containing a non-coordinating anion or similar entity include, for example, $B(C_6F_5)_3$, $[PhNMe_2H]^+[B(C_6F_5)_4]^-$; $[Ph_3C]^+[B(C_6F_5)_4]^-$, and $[PhNMe_2H]^+[B(C_{10}F_7)_4]^-$.

A non-coordinating anion (NCA) is defined to mean an anion either that does not coordinate to a transition metal center or that does coordinate to a transition metal center, but only weakly. The term NCA is defined to include multicomponent NCA-containing activators, such as N,N-dimethylanilinium tetrakis(pentafluorophenyl)borate and N,N-dimethylanilinium tetrakis(heptafluoronaphthyl)borate, that contain an acidic cationic group and the non-coordinating anion. The term NCA is also defined to include neutral Lewis acids, such as tris(pentafluorophenyl)boron, that can react with a transition metal complex to form an activated species by abstraction of an anionic group. Typically, NCAs coordinate weakly enough that a neutral Lewis base, such as an olefinically or acetylenically unsaturated monomer, can displace the NCA from the transition metal center. Any metal or metalloid that can form a compatible, weakly coordinating complex may be used or contained in the non-coordinating anion. Suitable metals include, but are not limited to, aluminum, gold, and platinum. Suitable metalloids include, but are not limited to, boron, aluminum, phosphorus, and silicon. The term non-coordinating anion includes neutral activators, ionic activators, and Lewis acid activators.

"Compatible" non-coordinating anions are those that are not degraded to neutrality when the initially formed complex decomposes. Further, the anion does not transfer an anionic substituent or fragment to the cation to cause it to form a neutral transition metal compound and a neutral byproduct from the anion. Non-coordinating anions useful in accordance with this disclosure include those that are compatible, stabilize the transition metal cation in the sense of balancing its ionic charge at +1, and yet retain sufficient lability to permit displacement during polymerization.

It is within the scope of this disclosure to use an ionizing, neutral, or ionic activator, such as tri(n-butyl)ammonium tetrakis(pentafluorophenyl)borate, a tris perfluorophenylboron metalloid precursor, or a trisperfluoronaphthylboron metalloid precursor, polyhalogenated heteroborane anions (WO 1998/043983), boric acid (U.S. Pat. No. 5,942,459), or any combination thereof. It is also within the scope of this disclosure to use neutral or ionic activators alone or in combination with alumoxane activators.

The catalyst systems of the present disclosure may include at least one non-coordinating anion (NCA) activator. Preferably, NCA activators represented by Formula (9) below may be used, $$Z_d^+(A^{d-}) \quad\quad\quad\quad \text{Formula (9)}$$

wherein Z is (L-H) or a reducible Lewis acid; L is a neutral Lewis base; H is hydrogen; (L-H) is a Bronsted acid; $A^{d-}$ is a non-coordinating anion having the charge $d^-$; and d is 1, 2, or 3.

The cation component $Z_d^+$ may include Bronsted acids such as protons or protonated Lewis bases or reducible Lewis acids capable of protonating or abstracting a moiety from the transition metal complexes to result in a cationic transition metal species.

The cation component $Z_d^+$ may also be a moiety such as silver, tropylium, carboniums, ferroceniums, and mixtures thereof, preferably carboniums and ferroceniums. Suitable reducible Lewis acids include any triaryl carbonium (where the aryl can be substituted or unsubstituted, such as those represented by the formula: $(Ar_3C^+)$, where Ar is aryl or aryl substituted with a heteroatom, a $C_1$ to $C_{40}$ hydrocarbyl, or a substituted $C_1$ to $C_{40}$ hydrocarbyl). Preferably, the reducible Lewis acids in Formula (2) defined as "Z" include those represented by the formula: $(Ph_3C)$, where Ph is a substituted or unsubstituted phenyl, preferably substituted with $C_1$ to $C_{40}$ hydrocarbyls, or substituted $C_1$ to $C_{40}$ hydrocarbyls, preferably $C_1$ to $C_{20}$ alkyls or aromatics, or substituted $C_1$ to $C_{20}$ alkyls or aromatics, and preferably $Z_d^+$ is triphenylcarbonium.

When $Z_d^+$ is the activating cation $(L-H)_d^+$, it is preferably a Bronsted acid, capable of donating a proton to the transition metal complex to result in a transition metal cation, including ammoniums, oxoniums, phosphoniums, silyliums, and mixtures thereof, preferably ammoniums of methylamine, aniline, dimethylamine, diethylamine, N-methylaniline, diphenylamine, trimethylamine, triethylamine, N,N-dimethylaniline, methyldiphenylamine, pyridine, p-bromo-N,N-dimethylaniline, p-nitro-N,N-dimethylaniline, phosphoniums from triethylphosphine, triphenylphosphine, and diphenylphosphine, oxoniums from ethers such as dimethyl ether diethyl ether, tetrahydrofuran, and dioxane, sulfoniums from thioethers, such as diethyl thioethers, tetrahydrothiophene, and mixtures thereof. The cation component $Z_d^+$ may also bear a long-chain alkyl or alkoxy modification to promote solubility of the NCA in an aliphatic hydrocarbon solvent.

The anion component $A^{d-}$ includes those having the formula $[M^{k+}G]^{d-}$ wherein k is 1, 2, or 3; g is 1, 2, 3, 4, 5, or 6 (preferably 1, 2, 3, or 4); g-k=d; M is an element selected from Group 13 of the Periodic Table of the Elements, preferably boron or aluminum, and G is independently a hydride, bridged or unbridged dialkylamido, halide, alkoxide, aryloxide, hydrocarbyl, substituted hydrocarbyl, halocarbyl, substituted halocarbyl, and halo-substituted hydrocarbyl radicals, said G having up to 20 carbon atoms with the proviso that in not more than 1 occurrence is G a halide. Preferably, each G is a fluorinated hydrocarbyl group having 1 to 20 carbon atoms, more preferably, each G is a fluorinated aryl group, and most preferably, each G is a pentafluoryl aryl group. Examples of suitable $A^{d-}$ also include diboron compounds as disclosed in U.S. Pat. No. 5,447,895, which is fully incorporated herein by reference with respect to the diboron compounds disclosed therein.

Preferably, NCA activators represented by Formula (10) may be used in the disclosure herein,

$[R^{1'}R^{2'}R^{3'}EH]^{d+}[Mt^{k+}Q_n]^{d-}$ Formula (10)

wherein E is nitrogen or phosphorus; d is 1, 2, or 3; k is 1, 2, or 3; n is 1, 2, 3, 4, 5, or 6; n−k=d (preferably d is 1, 2, or 3; k is 3; and n is 4, 5, or 6); $R^{1'}$, $R^{2'}$, and $R^{3'}$ are independently selected $C_1$-$C_{30}$, optionally substituted, hydrocarbyl groups; Mt is an element from group 13 of the Periodic Table, such as boron or phosphorus; and each Q is independently selected from a hydride, a bridged or unbridged dialkylamido, a halide, an alkoxide, an aryloxide, an optionally substituted hydrocarbyl group, an optionally substituted halocarbyl group, or the like. Preferably, each Q is a halo-substituted hydrocarbyl group. Preferably, $R^{1'}$, $R^{2'}$, and $R^{3'}$ collectively comprise 15 or more carbon atoms. More preferably, $R^{1'}$ is a methyl group, and $R^{2'}$ and $R^{3'}$ collectively comprise 14 or more carbon atoms. Still more preferably, suitable NCA activators may be represented by Formula (11)

$[R^{1'}R^{2'}R^{3'}EH]^+[BR^{4'}R^{5'}R^{6'}R^{7'}]^-$ Formula (11)

wherein E is nitrogen or phorphorus, preferably nitrogen; $R^{1'}$ is a methyl group; $R^{2'}$ and $R^{3'}$ are independently selected $C_4$-$C_{50}$, optionally substituted, hydrocarbyl groups that collectively comprise 14 or more carbon atoms; B is boron; and $R^{4'}$, $R^{5'}$, $R^{6'}$, and $R^{7'}$ are independently hydride, a bridged or unbridged dialkylamido group, a halide, an alkoxide, an aryloxide, a hydrocarbyl, or a halocarbyl. Preferably, $R^{4'}$, $R^{5'}$, $R^{6'}$, and $R^{7'}$ are each a halosubstituted hydrocarbyl group. More preferably, $R^{4'}$, $R^{5'}$, $R^{6'}$, and $R^{7'}$ are perfluorophenyl or perfluoronaphthyl. Optionally, at least one of $R^{4'}$, $R^{5'}$, $R^{6'}$, and $R^{7'}$ is not perfluorophenyl or perfluoronaphthyl.

Illustrative but not limiting examples of boron compounds which may be used as an activator are the compounds described as (and particularly those specifically listed as) activators in U.S. Pat. No. 8,658,556, which is incorporated by reference herein with respect to the boron compounds disclosed therein.

Preferably, the activator is one or more of N,N-dimethylanilinium tetra(perfluorophenyl)borate, N,N-dimethylanilinium tetrakis(perfluoronaphthyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, or triphenylcarbenium tetra(perfluorophenyl)borate. In any embodiment, the non-coordinating anion may be selected from N,N-dimethylanilinium tetrakis(perfluoronaphthyl)borate, N,N-dimethylanilinium tetrakis(perfluorobiphenyl)borate, N,N-dimethylanilinium tetrakis(perfluorophenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, $[Me_3NH^+][B(C_6F_5)^{4-}]$, 1-(4-(tris(pentafluorophenyl)borate)-2,3,5,6-tetrafluorophenyl)pyrrolidinium; $[Me_3NH^+][B(C_6F_5)^{4-}]$, 1-(4-(tris(pentafluorophenyl)borate)-2,3,5,6-tetrafluorophenyl)pyrrolidinium, sodium tetrakis(pentafluorophenyl)borate, potassium tetrakis(pentafluorophenyl)borate, and 4-(tris(pentafluorophenyl)borate)-2,3,5,6-tetrafluoropyridinium. Preferably, the non-coordinating anion may be N,N-dimethylanilinium tetrakis(perfluoronaphthyl)borate or N,N-dimethylanilinium tetrakis(perfluorophenyl)borate.

Bulky activators are also useful herein as NCAs. "Bulky activator" as used herein refers to anionic activators represented by Formulas (12) or (13) below.

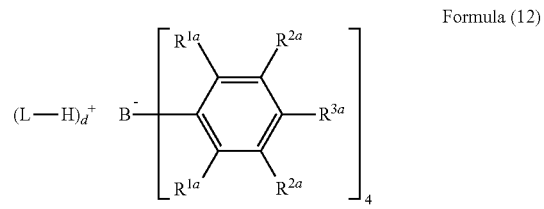
Formula (12)

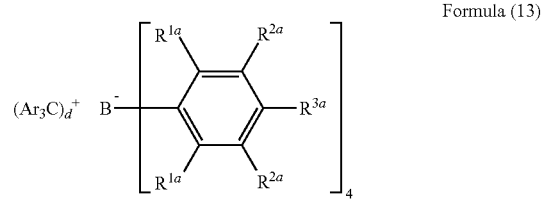
Formula (13)

In Formulas (12) and (13), each $R^{1a}$ is, independently, a halide, preferably a fluoride; Ar is substituted or unsubstituted aryl group (preferably a substituted or unsubstituted phenyl), preferably substituted with $C_1$ to $C_{40}$ hydrocarbyls, preferably $C_1$ to $C_{20}$ alkyls or aromatics; each $R^{2a}$ is, independently, a halide, a $C_6$ to $C_{20}$ substituted aromatic hydrocarbyl group or a siloxy group of the formula —O—Si—$R^a$, where $R^a$ is a $C_1$ to $C_{20}$ hydrocarbyl or hydrocarbylsilyl group (preferably $R^{2a}$ is a fluoride or a perfluorinated phenyl group); each $R^{3a}$ is a halide, $C_6$ to $C_{20}$ substituted aromatic hydrocarbyl group or a siloxy group of the formula —O—Si—$R^a$, where $R^a$ is a $C_1$ to $C_{20}$ hydrocarbyl or hydrocarbylsilyl group (preferably $R^{3a}$ is a fluoride or a $C_6$ perfluorinated aromatic hydrocarbyl group); wherein $R^{2a}$ and $R^{3a}$ can form one or more saturated or unsaturated, substituted or unsubstituted rings (preferably $R^{2a}$ and $R^{3a}$ form a perfluorinated phenyl ring); and L is a neutral Lewis base; (L-H)$^+$ is a Bronsted acid; d is 1, 2, or 3; wherein the anion has a molecular weight of greater than 1020 g/mol; wherein at least three of the substituents on the B atom each have a molecular volume of greater than 250 cubic Å, greater than 300 cubic Å, or greater than 500 cubic Å, as specified below.

Preferably, $(Ar_3C)_d^+$ is $(Ph_3C)_d^+$, where Ph is a substituted or unsubstituted phenyl, preferably substituted with $C_1$ to $C_{40}$ hydrocarbyls or substituted $C_1$ to $C_{40}$ hydrocarbyls, preferably $C_1$ to $C_{20}$ alkyls or aromatics or substituted $C_1$ to $C_{20}$ alkyls or aromatics.

"Molecular volume" is used herein as an approximation of spatial steric bulk of an activator molecule in solution. Comparison of substituents with differing molecular volumes allows the substituent with the smaller molecular volume to be considered "less bulky" in comparison to the substituent with the larger molecular volume. Conversely, a substituent with a larger molecular volume may be considered "more bulky" than a substituent with a smaller molecular volume. Molecular volume may be calculated as reported in "A Simple "Back of the Envelope" Method for Estimating the Densities and Molecular Volumes of Liquids and Solids," *Journal of Chemical Education*, v. 71(11), November 1994, pp. 962-964. Molecular volume (MV), in units of cubic Å, is calculated using the formula: MV=8.3$V_S$, where $V_S$ is the scaled volume. $V_S$ is the sum of the relative volumes of the constituent atoms, and is calculated from the molecular formula of the substituent using the following listing of relative volumes in Table 1. For fused rings, the $V_S$ is decreased by 7.5% per fused ring.

TABLE 1

| Element | Relative Volume |
| --- | --- |
| H | 1 |
| $1^{st}$ short period, Li to F | 2 |
| $2^{nd}$ short period, Na to Cl | 4 |
| $1^{st}$ long period, K to Br | 5 |
| $2^{nd}$ long period, Rb to I | 7.5 |
| $3^{rd}$ long period, Cs to Bi | 9 |

For a list of particularly useful bulky activators, U.S. Pat. No. 8,658,556, which is incorporated by reference herein with respect to its disclosure of bulky activators, may be consulted.

Exemplary non-coordinating anions useful herein and their respective scaled volumes and molecular volumes are shown in Table 2 below. The dashed bonds indicate bonding to boron.

TABLE 2

| Ion | Structure of Boron Substituents | Molecular Formula of Each Substituent | $V_S$ | MV Per subst. ($Å^3$) | Calculated Total MV ($Å^3$) |
| --- | --- | --- | --- | --- | --- |
| tetrakis(perfluorophenyl)borate | | $C_6F_5$ | 22 | 183 | 732 |
| tris(perfluorophenyl)-(perfluoronaphthyl)borate | | $C_6F_5$<br>$C_{10}F_7$ | 22<br>34 | 183<br>261 | 810 |
| (perfluorophenyl)tris-(perfluoronaphthyl)borate | | $C_6F_5$<br>$C_{10}F_7$ | 22<br>34 | 183<br>261 | 966 |
| tetrakis(perfluoronaphthyl)borate | | $C_{10}F_7$ | 34 | 261 | 1044 |
| tetrakis(perfluorobiphenyl)borate | | $C_{12}F_9$ | 42 | 349 | 1396 |

TABLE 2-continued

| Ion | Structure of Boron Substituents | Molecular Formula of Each Substituent | $V_S$ (Å³) | MV Per subst. (Å³) | Calculated Total MV (Å³) |
|---|---|---|---|---|---|
| [(C₆F₃(C₆F₅)₂)₄B] | 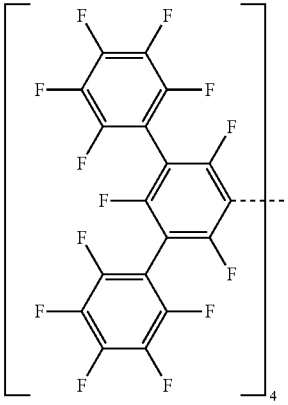 | $C_{18}F_{13}$ | 62 | 515 | 2060 |

In any embodiment, a NCA activator may be an activator as described in U.S. Pat. No. 6,211,105. The NCA activator-to-complex ratio may be from about a 1:1 molar ratio to about a 1,000:1 molar ratio, which includes, from about 0.1:1 to about 100:1, from about 0.5:1 to about 200:1, from about 1:1 to about 500:1, or from about 1:1 to about 1,000:1. A particularly useful range is from about 0.5:1 to about 10:1, preferably about 1:1 to about 5:1.

It is also within the scope of this disclosure that the transition metal complexes be activated with combinations of alumoxanes and NCAs (see for example, U.S. Pat. Nos. 5,153,157 and 5,453,410; EP 0573120B1, and International Patent Application Publications WO 1994/007928 and WO 1995/014044, which discuss the use of an alumoxane in combination with an ionizing activator).

Other preferred examples of non-coordinating anion activators may include those that are capable of dissolution in a non-aromatic solvent, such as an aliphatic hydrocarbon solvent. Such non-coordinating anion activators may include, in non-limiting embodiments, a cation component selected from among the following structures (or the phosphonium equivalent thereof) and an anion component selected from among fluorophenyl, fluoronaphthyl, and fluorobiphenyl borates, preferably perfluorophenyl, perfluoronaphthyl and perfluorobiphenyl borates.

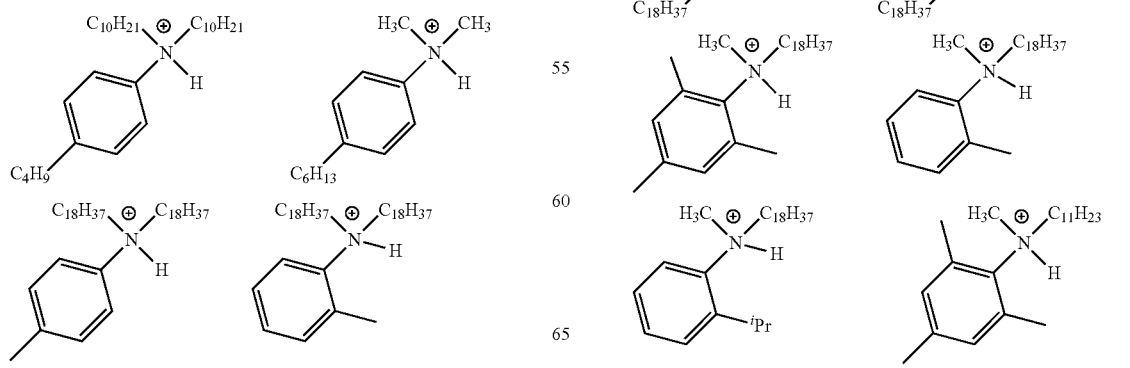

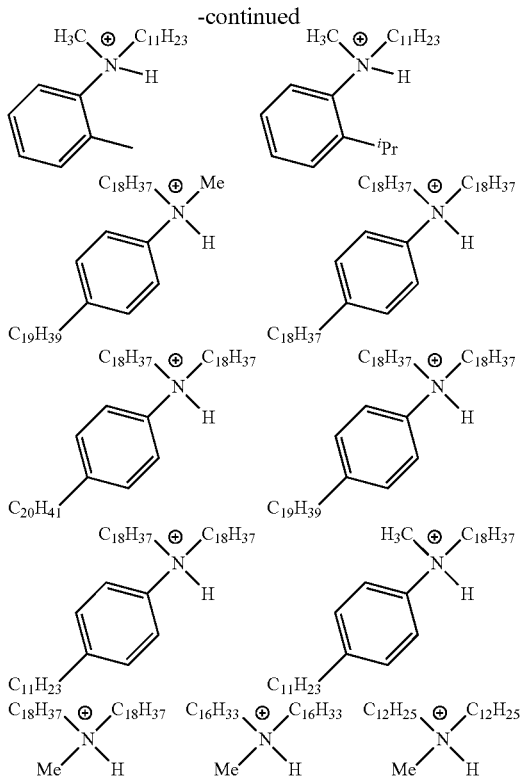

Any of the foregoing cation components may be combined with an anion component selected from among tetrakis(perfluoronaphthyl)borate, tetrakis(perfluorobiphenyl)borate, tetrakis(perfluorophenyl)borate, tetrakis(3,5-bis(trifluoromethyl)phenyl)borate, or the like.

Other non-coordinating anion activators suitable for use in the disclosure herein include those having a cation portion comprising [M2HTH]$^+$, in which a di(hydrogenated tallow)methylamine ("M2HTH") cation reacts with a basic leaving group on the transition metal complex to form a transition metal complex cation. Alternatively, the transition metal complex may be reacted with a neutral NCA precursor, such as B(C$_{10}$F$_7$)$_3$, which abstracts an anionic group from the complex to form an activated species. Useful activators also include di(hydrogenated tallow)methylamine(perfluoronaphthyl)borate (i.e., [M2HTH]B(C$_{10}$F$_7$)$_4$) and di(octadecyl)tolylamine (perfluoronaphthyl)borate (i.e., [DOdTH]B(C$_{10}$C$_7$)$_4$).

Still other activators that may be used for activation in a catalyst system according to the disclosure herein include one or more of N,N-di(hydrogenated tallow)methylammonium [tetrakis(perfluorophenyl)borate], N-methyl-4-nonadecyl-N-octadecylanilinium [tetrakis(perfluorophenyl)borate], N-methyl-4-hexadecyl-N-octadecylanilinium [tetrakis(perfluorophenyl)borate], N-methyl-4-tetradecyl-N-octadecylanilinium [tetrakis(perfluorophenyl)borate], N-methyl-4-dodecyl-N-octadecylanilinium [tetrakis(perfluorophenyl)borate], N-methyl-4-decyl-N-octadecylanilinium [tetrakis(perfluorophenyl)borate], N-methyl-4-octyl-N-octadecylanilinium [tetrakis(perfluorophenyl)borate], N-methyl-4-hexyl-N-octadecylanilinium [tetrakis(perfluorophenyl)borate], N-methyl-4-butyl-N-octadecylanilinium [tetrakis(perfluorophenyl)borate], N-methyl-4-octadecyl-N-decylanilinium [tetrakis(perfluorophenyl)borate], N-methyl-4-nonadecyl-N-dodecylanilinium [tetrakis(perfluorophenyl)borate], N-methyl-4-nonadecyl-N-tetradecylanilinium [tetrakis(perfluorophenyl)borate], N-methyl-4-nonadecyl-N-hexadecylanilinium [tetrakis(perfluorophenyl)borate], N-ethyl-4-nonadecyl-N-octadecylanilinium [tetrakis(perfluorophenyl)borate], N-methyl-N,N-dioctadecylammonium [tetrakis(perfluorophenyl)borate], N-methyl-N,N-dihexadecylammonium [tetrakis(perfluorophenyl)borate], N-methyl-N,N-ditetradecylammonium [tetrakis(perfluorophenyl)borate], N-methyl-N,N-didodecylammonium [tetrakis(perfluorophenyl)borate], N-methyl-N,N-didecylammonium [tetrakis(perfluorophenyl)borate], N-methyl-N,N-dioctylammonium [tetrakis(perfluorophenyl)borate], N-ethyl-N,N-dioctadecylammonium [tetrakis(perfluorophenyl)borate], N,N-di(octadecyl)tolylammonium [tetrakis(perfluorophenyl)borate], N,N-di(hexadecyl)tolylammonium [tetrakis(perfluorophenyl)borate], N,N-di(tetradecyl)tolylammonium [tetrakis(perfluorophenyl)borate], N,N-di(dodecyl)tolylammonium [tetrakis(perfluorophenyl)borate], N-octadecyl-N-hexadecyl-tolylammonium [tetrakis(perfluorophenyl)borate], N-octadecyl-N-hexadecyl-tolylammonium [tetrakis(perfluorophenyl)borate], N-octadecyl-N-tetradecyl-tolylammonium [tetrakis(perfluorophenyl)borate], N-octadecyl-N-dodecyl-tolylammonium [tetrakis(perfluorophenyl)borate], N-octadecyl-N-decyl-tolylammonium [tetrakis(perfluorophenyl)borate], N-hexadecyl-N-tetradecyl-tolylammonium [tetrakis(perfluorophenyl)borate], N-hexadecyl-N-dodecyl-tolylammonium [tetrakis(perfluorophenyl)borate], N-hexadecyl-N-decyl-tolylammonium [tetrakis(perfluorophenyl)borate], N-tetradecyl-N-dodecyl-tolylammonium [tetrakis(perfluorophenyl)borate], N-tetradecyl-N-decyl-tolylammonium [tetrakis(perfluorophenyl)borate], N-dodecyl-N-decyl-tolylammonium [tetrakis(perfluorophenyl)borate], N-methyl-N-octadecylanilinium [tetrakis(perfluorophenyl)borate], N-methyl-N-hexadecylanilinium [tetrakis(perfluorophenyl)borate], N-methyl-N-tetradecylanilinium [tetrakis(perfluorophenyl)borate], N-methyl-N-dodecylanilinium [tetrakis(perfluorophenyl)borate], N-methyl-N-decylanilinium [tetrakis(perfluorophenyl)borate], and N-methyl-N-octylanilinium [tetrakis(perfluorophenyl)borate].

In any embodiment, a catalyst system suitable for use in the present disclosure may be disposed on a solid support. The solid support may allow a catalytic reaction, such as polymerization of an olefinic feed, to be conducted under heterogeneous conditions, such as in the gas phase or under slurry polymerization conditions. Suitable solid supports may include, but are not limited to, silica, functionalized silica, alumina, magnesium chloride, talc, inorganic oxides, or chlorides including one or more metals from Groups 2, 3, 4, 5, 13, or 14 of the Periodic Table, and polymers such as polystyrene, or functionalized and/or cross-linked polymers. Other inorganic oxides that may suitably function as solid supports include, for example, titania, zirconia, boron oxide, zinc oxide, magnesia, or any combination thereof. Combinations of inorganic oxides may be suitably used as solid supports as well. Illustrative combinations of suitable inorganic oxides include, but are not limited to, silica-alumina, silica-titania, silica-zirconia, silica-boron oxide, and the like.

In any embodiment, an alumoxane or other suitable activator may be disposed on silica or another suitable solid support before being combined with the transition metal complexes disclosed herein. The transition metal complexes disclosed herein may alternately be disposed upon silica or another suitable support before being combined with an alumoxane or other suitable activator. Upon combining the activator and the solid support with the transition metal complexes, the resulting catalyst system may become disposed upon the solid support.

Solid supports suitable for use in the disclosure herein may have a surface area ranging from about 1 m$^2$/g to about 1,000 m$^2$/g, about 5 m$^2$/g to about 900 m$^2$/g, about 50 m$^2$/g to about 500 m$^2$/g, or about 100 m$^2$/g to about 400 m$^2$/g. In any embodiment, a solid support may have a pore volume ranging from about 0.01 cm$^3$/g to about 4 cm$^3$/g, about 0.1 cm$^3$/g to about 3 cm$^3$/g, about 0.8 cm$^3$/g to about 3 cm$^3$/g, or about 1 cm$^3$/g to about 2.5 cm$^3$/g. In any embodiment, a solid support may have an average particle size ranging from about 0.1 µm low of about 500 µm, about 0.3 µm to about 400 µm, about 0.5 µm to about 250 µm, about 1 µm to about 200 µm, about 5 µm to about 150 µm, or about 10 µm to about 100 µm.

In another aspect, the present disclosure relates to polymer compositions obtained from the catalyst systems and processes set forth herein. Advantageously, the catalyst systems and polymer compositions obtained therefrom may be substantially free of aromatic solvent, in view of the use of aliphatic hydrocarbon solvents in the disclosure herein.

The aliphatic hydrocarbon solubility of the non-coordinating anion activators used in the present disclosure may increase with the number of aliphatic carbons in the cation portion (i.e., the ammonium or the phosphonium cation). In at least one embodiment, an aliphatic hydrocarbon solubility of at least about 5 mM or at least about 10 mM may be achieved with an activator having an ammonium or phosphonium group of about 15 aliphatic carbon atoms or more, such as about 20 aliphatic carbon atoms or more, or such as about 25 aliphatic carbons atoms or more, or such as about 30 carbon atoms or more, or such as about 35 carbon atoms or more. Preferably, the cation may comprise an ammonium cation, which may be an anilinium cation in some instances.

Useful aliphatic hydrocarbon solvents in which the non-coordinating anion activators may be soluble at 25° C. at the foregoing concentrations can include isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In at least one embodiment, aromatic solvents are present in the solvent at less than 1 wt %, such as less than 0.5 wt %, such as at 0 wt % based upon the weight of the solvents. The activators of the present disclosure can be dissolved in one or more additional solvents, if desired. Additional solvents may include ethereal, halogenated or N,N-dimethylformamide solvents.

In more specific examples, the non-coordinating anion activator may have a solubility of at least about 5 mM at 25° C. in methylcyclohexane or isohexane.

Polymerization Methods

Polymerization methods using the catalyst systems described hereinabove are also provided by the present disclosure. The polymerization methods may comprise contacting a catalyst system comprising an activator and an aliphatic hydrocarbon solution of a non-metallocene transition metal complex with an olefinic feed comprising one or more olefins under polymerization reaction conditions to form a polyolefin. Contacting may take place under solution or bulk polymerization conditions. Optionally, the catalyst systems may be deposited upon a solid support, using an aliphatic hydrocarbon solution of the transition metal complex to do so, and polymerization of the olefin may take place under gas phase or slurry reaction conditions using the supported catalyst system. Further examples of suitable polymerization reaction conditions are provided hereinbelow.

Polymerization processes of the present disclosure may polymerize at least one olefinic monomer, preferably at least one of propylene or ethylene, and optionally an additional comonomer, through contacting a catalyst system as specified above under polymerization reaction conditions. Olefinic monomers useful in the disclosure herein include substituted or unsubstituted $C_2$ to $C_{40}$ alpha olefins, such as $C_2$ to $C_{20}$ alpha olefins, such as $C_2$ to $C_{12}$ alpha olefins, such as ethylene, propylene, butene, pentene, hexene, heptene, octene, nonene, decene, undecene, dodecene, and isomers thereof. In at least one embodiment, the at least one olefinic monomer may comprise propylene and an optional comonomer comprising one or more ethylene or $C_4$ to $C_{40}$ olefins, such as $C_4$ to $C_{20}$ olefins, such as $C_6$ to $C_{12}$ olefins. The $C_4$ to $C_{40}$ olefins may be linear, branched, or cyclic. The $C_4$ to $C_{40}$ cyclic olefins may be strained or unstrained, monocyclic or polycyclic, and may optionally include heteroatoms and/or one or more functional groups. In at least one embodiment, the at least one olefinic monomer may comprise propylene and an optional comonomer comprising one or more $C_3$ to Coo olefins, such as $C_4$ to $C_{20}$ olefins, such as $C_6$ to $C_{12}$ olefins. The $C_3$ to $C_{40}$ olefins may be linear, branched, or cyclic. The $C_3$ to $C_{40}$ cyclic olefins may be strained or unstrained, monocyclic or polycyclic, and may optionally include heteroatoms and/or one or more functional groups.

Exemplary $C_2$ to $C_{40}$ olefin monomers and optional comonomers suitable for polymerization according to the disclosure herein include ethylene, propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbomadiene, substituted derivatives thereof, and isomers thereof, such as hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologs and derivatives, such as norbornene, norbornadiene, and dicyclopentadiene.

In at least one embodiment, one or more dienes are present in the polymer produced herein at up to 10 wt %, such as at 0.00001 to 1.0 wt %, such as 0.002 to 0.5 wt %, such as 0.003 to 0.2 wt %, based upon the total weight of the composition. In some embodiments, 500 ppm or less of diene is added to the polymerization, such as 400 ppm or less, such as 300 ppm or less. In other embodiments at least 50 ppm of diene is added to the polymerization, or 100 ppm or more, or 150 ppm or more.

Diene monomers include any hydrocarbon structure, such as $C_4$ to $C_{30}$, having at least two unsaturated bonds, wherein at least two of the unsaturated bonds are readily incorporated into a polymer by either a stereospecific or a non-stereospecific catalyst(s). The diene monomers can be selected from alpha, omega-diene monomers (i.e. di-vinyl monomers). The diolefin monomers include linear di-vinyl monomers, such as those containing from 4 to 30 carbon atoms. Examples of diene monomers include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, 1,6-heptadiene, 1,7-octadiene, 1,8- nonadiene, 1,9-decadiene, 1,10-undecadiene, 1,11-dodecadiene, 1,12-tridecadiene, 1,13-tetradecadiene, and low molecular weight polybutadienes (Mw less than 1,000 g/mol). Cyclic dienes include cyclopentadiene, vinylnorbornene, norbomadiene, ethylidene norbornene, divinylbenzene, dicyclopentadiene, or higher ring-containing diolefins with or without substituents at various ring positions.

Preferably, contacting the catalyst systems of the present disclosure with the one or more olefins may take place in a substantial absence of aromatic solvent. Solution, suspension, bulk, or slurry polymerization processes, for example, may take place in the presence of one or more aliphatic solvents, wherein aromatic solvents may be excluded or substantially excluded. Gas phase polymerization processes may also be employed when the catalyst systems are deposited upon a suitable solid support.

Polymerization processes of the present disclosure can be carried out in any suitable manner. Any suitable suspension, homogeneous, bulk, solution, slurry, or gas phase polymerization process can be used. Such processes can be run in a batch, semi-batch, or continuous mode. Some polymerization processes of the present disclosure may be continuous and run in the gas phase or under slurry conditions. Preferably, polymerization processes of the present disclosure may be conducted in a solution phase in a substantial absence of aromatic hydrocarbon solvents.

Suitable diluents/solvents for solution and slurry polymerization reactions include non-coordinating, inert liquids, preferably aliphatic hydrocarbons. Examples include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (ISOPAR™). Perhalogenated hydrocarbons, such as perfluorinated $C_4$-$C_{10}$ alkanes, chlorobenzene, and aromatic and alkylsubstituted aromatic compounds, such as benzene, toluene, mesitylene, and xylene may also be suitably used in some instances. Suitable solvents also include liquid olefins which may act as monomers or comonomers including ethylene, propylene, 1-butene, 1-hexene, 1-pentene, 3-methyl-1-pentene, 4-methyl-1-pentene, 1-octene, 1-decene, and mixtures thereof. In at least one embodiment, the solvent is not aromatic, such that aromatic hydrocarbon solvents are present in the solvent at less than 1 wt %, such as less than 0.5 wt %, based upon the weight of the solvents. More preferably, contacting the catalyst system with the one or more olefinic monomers may take place in a substantial absence of aromatic hydrocarbon solvent.

Polymerizations can be performed at any temperature and/or pressure suitable to obtain the desired polymers, such as ethylene and/or propylene polymers. Typical temperatures and/or pressures comprising the polymerization reaction conditions may include a temperature in the range of about 0° C. to 300° C., such as 20° C. to 200° C., such as 35° C. to 150° C., such as 40° C. to 120° C., such as 45° C. to 80° C., for example about 74° C., and a pressure in the range of about 0.35 MPa to 10 MPa, such as 0.45 MPa to 6 MPa, such as 0.5 MPa to 4 MPa.

The run time of the polymerization reaction may be up to about 300 minutes, such as in the range of from 5 to 250 minutes, such as 10 to 120 minutes.

In at least one embodiment, hydrogen may be present in the polymerization reactor at a partial pressure of 0.001 to 50 psig (0.007 to 345 kPa), such as from 0.01 to 25 psig (0.07 to 172 kPa), such as 0.1 to 10 psig (0.7 to 70 kPa).

In at least one embodiment, the activity of the catalyst may be from 50 gP/mmolCat/hour to 200,000 gP/mmolCat/hr, such as from 10,000 gP/mmolCat/hr to 150,000 gP/mmolCat/hr, such as from 40,000 gP/mmolCat/hr to 100,000 gP/mmolCat/hr, such as about 50,000 gP/mmolCat/hr or more, such as 70,000 gP/mmolCat/hr or more. In at least one embodiment, the conversion of olefin monomers may be at least 10%, based upon polymer yield and the weight of the monomer entering the reaction zone, such as 20% or more, such as 30% or more, such as 50% or more, such as 80% or more.

In at least one embodiment, the polymerization: 1) is conducted at temperatures of 0 to 300° C. (such as 25 to 150° C., such as 40 to 120° C., such as 70 to 110° C., such as 85 to 100° C.); 2) is conducted at a pressure of atmospheric pressure to 10 MPa (such as 0.35 to 10 MPa, such as from 0.45 to 6 MPa, such as from 0.5 to 4 MPa); 3) is conducted in an aliphatic hydrocarbon solvent (such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, where aromatics are present in the solvent at less than 1 wt %, such as less than 0.5 wt %, such as at 0 wt % based upon the weight of the solvents); and 4) the productivity of the catalyst compound is at least 30,000 gP/mmolCat/hr (such as at least 50,000 gP/mmolCat/hr, such as at least 60,000 gP/mmolCat/hr, such as at least 80,000 gP/mmolCat/hr, such as at least 100,000 gP/mmolCat/hr).

In at least one embodiment, the catalyst system used in the polymerization reaction comprises no more than one transition metal complex. A "reaction zone" also referred to as a "polymerization zone" is a vessel where polymerization takes place, for example a batch reactor for a solution polymerization process. When multiple reactors are used in either series or parallel configuration, each reactor is considered as a separate polymerization zone. For a multi-stage polymerization in both a batch reactor and a continuous reactor, each polymerization stage is considered as a separate polymerization zone. In at least one embodiment, the polymerization occurs in one reaction zone.

Gas phase polymerization processes may be conducted under fluidized gas bed conditions used for producing polymers, such that a gaseous stream containing one or more monomers is continuously cycled through a fluidized bed of the catalyst system under polymerization reaction conditions. In gas phase polymerization, the transition metal complex and/or the activator of the catalyst system may be deposited upon a support. The gaseous stream is withdrawn from the fluidized bed and recycled back into the reactor. Simultaneously, polymer product is withdrawn from the reactor and fresh monomer is added to replace the polymerized monomer. (See, for example, U.S. Pat. Nos. 4,543, 399; 4,588,790; 5,028,670; 5,317,036; 5,352,749; 5,405, 922; 5,436,304; 5,453,471; 5,462,999; 5,616,661; and 5,668,228; all of which are fully incorporated herein by reference.)

In a slurry polymerization, a suspension of the catalyst system is formed in a liquid polymerization diluent medium to which monomer and comonomers are introduced. Slurry phase polymerization processes generally operate between 1 to about 50 atmosphere pressure range (15 psi to 735 psi, 103 kPa to 5,068 kPa) or even greater and temperatures in the range of 0° C. to about 120° C. In slurry phase polymerization, the transition metal complex and/or the activator of the catalyst system may be deposited upon a support. The suspension including diluent is intermittently or continuously removed from the reactor where the volatile components are separated from the polymer and recycled, optionally after a distillation, to the reactor. The liquid diluent used in the polymerization medium may be an alkane having from 3 to 7 carbon atoms, such as a branched alkane. The liquid diluent may be chosen to remain as a liquid under the polymerization reaction conditions. When a propane medium is used, the process must be operated above the critical temperature and pressure of the liquid diluent. Optionally, a hexane or an isobutane medium may be employed.

In at least one embodiment, polymerization processes of the present disclosure may include a particle form polymerization, or a slurry process, where the temperature is kept below the temperature at which the polymer goes into solution. Such techniques are well known in the art, and are described in, for instance, U.S. Pat. No. 3,248,179 which is fully incorporated herein by reference. The temperature in the particle form polymerization process can be from about 85° C. to about 110° C. Two example polymerization methods for the slurry process are those using a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484, which is herein fully incorporated by reference.

In another embodiment, the slurry process may be carried out continuously in a loop reactor. The catalyst, as a slurry in isohexane or as a dry free-flowing powder, is injected regularly to the reactor loop, which is itself filled with circulating slurry of growing polymer particles in a diluent of isohexane containing monomer and optional comonomer. Hydrogen, optionally, may be added as a molecular weight control. In at least one embodiment, hydrogen may be added from 50 ppm to 500 ppm, such as from 100 ppm to 400 ppm, such as 150 ppm to 300 ppm.

The reactor may be maintained at a pressure of 2,000 kPa to 5,000 kPa, such as from 3,620 kPa to 4,309 kPa, and at a temperature of about 60° C. to about 120° C. depending on the desired polymer melting characteristics. Reaction heat is removed through the loop wall since much of the reactor is in the form of a double jacketed pipe. The slurry is allowed to exit the reactor at regular intervals or continuously to a heated low pressure flash vessel, rotary dryer and a nitrogen purge column in sequence for removal of the isohexane diluent and all unreacted monomer and comonomer. The resulting hydrocarbon free powder is then compounded for use in various applications.

Polymer Products

The present disclosure also provides compositions of matter which can be produced by the methods described herein. In at least one embodiment, a catalyst system of the present disclosure is capable of producing a polyolefin.

In any embodiment herein, the compositions described herein may comprise a polyolefin that is free or substantially free of toluene or other aromatic solvents.

In at least one embodiment, a polyolefin is a propylene homopolymer, an ethylene homopolymer or an ethylene copolymer, such as propylene-ethylene and/or ethylene-alphaolefin (such as $C_4$ to $C_{20}$) copolymer (such as an ethylene-hexene copolymer or an ethylene-octene copolymer). A polyolefin can have an Mw/Mn of greater than 1.

In at least one embodiment, a polyolefin is a homopolymer of ethylene or propylene or a copolymer of ethylene such as a copolymer of ethylene having from 0.1 to 25 wt % (such as from 0.5 to 20 wt %, such as from 1 to 15 wt %, such as from 5 to 17 wt %) of ethylene with the remainder balance being one or more $C_3$ to $C_{20}$ olefin comonomers (such as $C_3$ to $C_{12}$ alpha-olefin, such as propylene, butene, hexene, octene, decene, dodecene, such as propylene, butene, hexene, octene). A polyolefin can be a copolymer of propylene such as a copolymer of propylene having from 0.1 to 25 wt % (such as from 0.5 to 20 wt %, such as from 1 to 15 wt %, such as from 3 to 10 wt %) of propylene and from 99.9 to 75 wt % of one or more of $C_2$ or $C_4$ to $C_{20}$ olefin comonomer (such as ethylene or $C_4$ to $C_{12}$ alpha-olefin, such as butene, hexene, octene, decene, dodecene, such as ethylene, butene, hexene, octene).

In at least one embodiment, a catalyst system of the present disclosure is capable of producing polyolefins, such as polyethylene, polypropylene (e.g., iPP), or ethylene-octene copolymers, having an Mw from 500 to 2,500,000, such as from 20,000 to 2,000,000, such as from 30,000 to 1,500,000, such as from 40,000 to 1,000,000, such as from 50,000 to 900,000, such as from 60,000 to 800,000.

In at least one embodiment, a catalyst system of the present disclosure is capable of producing polyolefins, such as polyethylene, polypropylene (e.g., iPP), or ethylene-octene copolymers having an Mw/Mn value from 1 to 10, such as from 1.5 to 9, such as from 2 to 7, such as from 2 to 4, such as from 2.5 to 3, for example about 2.

In at least one embodiment, a catalyst system of the present disclosure is capable of producing polyolefins, such as polyethylene, polypropylene (e.g., iPP), or ethylene-octene copolymers having a melting temperature (Tm) of less than 140° C., or 30° C. to 150° C., such as 40° C. to 140° C., such as 45° C. to 135° C., such as 50° C. to 135° C.

In at least one embodiment, a polymer of the present disclosure may have a $g'_{vis}$ of greater than 0.9, such as greater than 0.92, such as greater than 0.95.

In at least one embodiment, the polymer is an ethylene copolymer, and the comonomer is octene, at a comonomer content of 1 wt % to 18 wt % octene, such as from 5 wt % to 15 wt %, such as from 8 wt % to 13 wt %, such as from 9 wt % to 12 wt %.

In at least one embodiment, the polymer produced herein has a unimodal or multimodal molecular weight distribution as determined by Gel Permeation Chromatography (GPC). By "unimodal" is meant that the GPC trace has one peak or inflection point. By "multimodal" is meant that the GPC trace has at least two peaks or inflection points. An inflection point is that point where the second derivative of the curve changes in sign (e.g., from negative to positive or vice versa).

All the concentration is expressed in g/cm$^3$, molecular weight is expressed in g/mole, and intrinsic viscosity is expressed in dL/g unless otherwise noted.

All molecular weights are reported in g/mol unless otherwise noted.

Blends

In another embodiment, the polymer (such as the polyethylene or polypropylene) produced herein may be combined with one or more additional polymers prior to being formed into a film, molded part or other article. Other useful polymers include polyethylene, isotactic polypropylene, highly isotactic polypropylene, syndiotactic polypropylene, random copolymer of propylene and ethylene, and/or butene, and/or hexene, polybutene, ethylene vinyl acetate, low density polyethylene (LDPE), linear low density polyethylene (LLDPE), high density polyethylene (HDPE), ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, ethylene-propylene rubber (EPR), vulcanized EPR, EPDM, block copolymer, styrenic block copolymers, polyamides, polycarbonates, PET resins, cross linked polyethylene, copolymers of ethylene and vinyl alcohol (EVOH), polymers of aromatic monomers such as polystyrene, poly-1 esters, polyacetal, polyvinylidine fluoride, polyethylene glycols, and/or polyisobutylene.

In at least one embodiment, the polymer (such as polyethylene or polypropylene) is present in the above blends, at from 10 to 99 wt %, based upon the weight of the polymers in the blend, such as 20 to 95 wt %, such as at least 30 to 90 wt %, such as at least 40 to 90 wt %, such as at least 50 to 90 wt %, such as at least 60 to 90 wt %, such as at least 70 to 90 wt %.

The blends described above may be produced by mixing the polymers of the present disclosure with one or more polymers (as described above), by connecting reactors together in series to make reactor blends or by using more than one catalyst in the same reactor to produce multiple species of polymer. The polymers can be mixed together prior to being put into the extruder or may be mixed in an extruder.

The blends may be formed using conventional equipment and methods, such as by dry blending the individual components and subsequently melt mixing in a mixer, or by mixing the components together directly in a mixer, such as, for example, a Banbury mixer, a Haake mixer, a Brabender internal mixer, or a single or twin-screw extruder, which may include a compounding extruder and a side-arm extruder used directly downstream of a polymerization process, which may include blending powders or pellets of the resins at the hopper of the film extruder. Additionally, additives may be included in the blend, in one or more components of the blend, and/or in a product formed from the blend, such as a film, as desired. Such additives are well known in the art, and can include, for example: fillers; antioxidants (e.g., hindered phenolics such as IRGANOX™ 1010 or IRGANOX™ 1076 available from Ciba-Geigy); phosphites (e.g., IRGAFOS™ 168 available from Ciba-Geigy); anti-cling additives; tackifiers, such as polybutenes, terpene resins, aliphatic and aromatic hydrocarbon resins, alkali metal and glycerol stearates, and hydrogenated rosins; UV stabilizers; heat stabilizers; anti-blocking agents; release agents; anti-static agents; pigments; colorants; dyes; waxes; silica; fillers; and talc.

Embodiments Disclosed Herein Include:

A. Catalyst solutions. The catalyst solutions comprise: a non-metallocene transition metal complex dissolved in an aliphatic hydrocarbon solvent at a concentration ranging from about 2 mM to about 20 mM at 23° C. in the presence of an organoaluminum compound; wherein a molar ratio of aluminum of the organoaluminum compound to transition metal of the non-metallocene transition metal complex is about 1:1 or greater, and the organoaluminum compound comprises at least about 8 carbons per aluminum; and wherein the non-metallocene transition metal complex has an aliphatic hydrocarbon solubility of less than 2 mM in an absence of the organoaluminum compound.

B. Catalyst systems. The catalyst systems comprise: the catalyst solution of A, and at least one activator effective to activate the non-metallocene transition metal complex.

C. Polymerization methods. The methods comprise: contacting the catalyst system of B with an olefinic feed comprising one or more olefins under polymerization reaction conditions to form a polyolefin.

Embodiments A-C may have one or more of the following elements in any combination:

Element 1: wherein a reaction product of the non-metallocene transition metal complex and the organoaluminum compound or an adduct of the non-metallocene transition metal complex and the organoaluminum compound is dissolved in the aliphatic solvent.

Element 2: wherein the non-metallocene transition metal complex has a structure represented by $LM(X)_2$; wherein M is a transition metal, L is a dianionic ligand coordinated to M, and X is an anionic group containing six or fewer non-hydrogen atoms, or two Xs are joined to form a ring defining a chelating ligand, a diene ligand or an alkylidene ligand.

Element 3: wherein each X is a $C_1$-$C_6$ hydrocarbyl group.

Element 4: wherein each X is a methyl group.

Element 5: wherein the non-metallocene transition metal complex comprises at least one complex selected from the group consisting of a pyridyldiamide, a quinolinoyldiamide, a bis(phenolate), and a heterocyclic amide complex.

Element 6: wherein the solution comprises at most about 5 ppm aromatic solvent.

Element 7: wherein the aromatic solvent comprises toluene.

Element 8: wherein the organoaluminum compound comprises at least one compound selected from the group consisting of a trialkylaluminum, a bis(dialkylaluminum) oxide, a dialkylaluminum hydride, a dialkylaluminum alkoxide, an alkylaluminum bisalkoxide, an aluminum trisalkoxide, a dialkylaluminum halide, an alkylaluminum dihalide, and any combination thereof.

Element 9: wherein the organoaluminum compound comprises at least one compound selected from the group consisting of a trialkylaluminum, a bis(dialkylaluminum) oxide, a dialkylaluminum hydride, and any combination thereof.

Element 10: wherein the organoaluminum compound comprises two or more alkyl groups, and the alkyl groups are $C_3$ or larger.

Element 11: wherein the organoaluminum compound comprises two or more alkyl groups, and the alkyl groups are $C_4$ or larger.

Element 12: wherein the organoaluminum compound comprises at least about 12 carbons per aluminum.

Element 13: wherein the organoaluminum compound comprises at least about 16 carbons per aluminum.

Element 14: wherein the aliphatic hydrocarbon solvent comprises a linear, branched, cyclic, or branched cyclic aliphatic hydrocarbon having 9 or fewer carbons.

Element 15: wherein the aliphatic hydrocarbon solvent comprises a linear, branched, cyclic, or branched cyclic aliphatic hydrocarbon having 5 to 7 carbons.

Element 16: wherein the aliphatic hydrocarbon solvent is methylcyclohexane, isohexane, or any combination thereof.

Element 17: wherein the solution consists essentially of the non-metallocene transition metal complex, the aliphatic hydrocarbon solvent, and the organoaluminum compound.

Element 18: wherein the at least one activator comprises an activator selected from the group consisting of an alumoxane, a non-coordinating anion activator, and any combination thereof.

Element 19: wherein the non-coordinating anion activator comprises an anion portion selected from the group consisting of tetrakis(perfluorophenyl)borate, tetrakis(perfluoronaphthyl)borate, and tetrakis(perfluorobiphenyl)borate.

Element 20: wherein the catalyst system comprises at most about 5 ppm aromatic solvent.

Element 21: wherein the aromatic solvent comprises toluene.

Element 22: wherein contacting takes place in a substantial absence of aromatic solvent.

Element 23: wherein the aromatic solvent comprises toluene.

Element 24: wherein the one or more olefins comprise at least one alpha olefin.

Element 25: wherein contacting takes place under solution polymerization conditions.

By way of non-limiting example, illustrative combinations applicable to A-C include, but are not limited to: 1 and 2; 1 and 3; 1 and 4; 1 and 5; 1 and 6; 1, 6 and 7; 1, and 8 or 9; 1, and 10 or 11; 1, and 12 or 13; 1, and 14 or 15; 1 and 16; 1 and 17; 2 and 3; 2 and 4; 2, 3, and 5; 2, 4, and 5; 2 and 5; 2 and 6; 2, 6, and 7; 2, and 8 or 9; 2, and 10 or 11; 2, and 12 or 13; 2, and 14 or 15; 2 and 16; 2 and 17; 2, 3 or 4, 6 and 7; 2, 3 or 4, and 8 or 9; 2, 3 or 4, and 10 or 11; 2, 3 or 4, and 12 or 13; 2, 3 or 4, and 14 or 15; 2, 3 or 4, and 16; 2, 3 or 4, and 17; 5 and 6; 5-7; 5, and 8 or 9; 5, and 10 or 11; 5, and 12 or 13; 5, and 14 or 15; 5 and 16; 5 and 17; 6, and 8 or 9; 6, and 10 or 11; 6, and 12 or 13; 6, and 14 or 15; 6 and 16; 6 and 17; 8 or 9, and 10 or 11; 8 or 9, and 12 or 13; 8 or 9, and 14 or 15; 8 or 9, and 16; 8 or 9, and 17; 10 or 11, and 12 or 13; 10 or 11, and 14 or 15; 10 or 11, and 16; 10 or 11, and 17; 14 or 15, and 16; 14 or 15, and 17; and 16 and 17. Further exemplary combinations applicable to B include, but are not limited to, one or more of 1-17 in combination with one or more of 18-21; 18 and 20; 18, 20 and 21; 19 and 20; and 19-21. Illustrative combinations applicable to B include, but are not limited to, 2, and 18 or 19; 5, and 18 or 19; 6 or 20, and 18 or 19; 2, 8 or 9, and 18 or 19; 5, 8 or 9, and 18 or 19; 8 or 9, and 18 or 19; 10 or 11, and 18 or 19; 12 or 13, and 18 or 19; 14 or 15, and 18 or 19; 16, and 18 or 19; and 17, and 18 or 19. Further exemplary combinations applicable to C include, but are not limited to, one or more of 1-21 in combination with one or more of 22-25; 22 and 23; 21 and 24; 22 and 25; and 24 and 25. Illustrative combinations applicable to C include, but are not limited to, 2, and 22, 24 or 25; 5, and 22, 24 or 25; 6 or 20, and 22, 24 or 25; 2, 8 or 9, and 22, 24 or 25; 5, 8 or 9, and 22, 24 or 25; 8 or 9, and 22, 24 or 25; 10 or 11, and 22, 24 or 25; 12 or 13, and 22, 24 or 25; 14 or 15, and 22, 24 or 25; 16, and 22, 24 or 25; and 17, and 22, 24 or 25.

The present disclosure relates to:

1. A solution comprising:

a non-metallocene transition metal complex dissolved in an aliphatic hydrocarbon solvent at a concentration ranging from about 2 mM to about 20 mM at 23° C. in the presence of an organoaluminum compound;

wherein a molar ratio of aluminum of the organoaluminum compound to transition metal of the non-metallocene transition metal complex is about 1:1 or greater, and the organoaluminum compound comprises at least about 8 carbons per aluminum; and wherein the non-metallocene transition metal complex has an aliphatic hydrocarbon solubility of less than 2 mM in an absence of the organoaluminum compound.

2. The solution of paragraph 1, wherein a reaction product of the non-metallocene transition metal complex and the organoaluminum compound or an adduct of the non-metallocene transition metal complex and the organoaluminum compound is dissolved in the aliphatic solvent.

3. The solution of paragraph 1 or paragraph 2, wherein the non-metallocene transition metal complex has a structure represented by $LM(X)_2$;

wherein M is a transition metal, L is a dianionic ligand coordinated to M, and X is an anionic group containing six or fewer non-hydrogen atoms, or two Xs are joined to form a ring defining a chelating ligand, a diene ligand or an alkylidene ligand.

4. The solution of paragraph 3, wherein each X is a $C_1$-$C_6$ hydrocarbyl group.

5. The solution of paragraph 3, wherein each X is a methyl group.

6. The solution of any one of paragraphs 1-5, wherein the non-metallocene transition metal complex comprises at least one complex selected from the group consisting of a pyridyldiamide, a quinolinoyldiamide, a bis(phenolate), and a heterocyclic amide complex.

7. The solution of any one of paragraphs 1-6, wherein the solution comprises at most about 5 ppm aromatic solvent.

8. The solution of paragraph 7, wherein the aromatic solvent comprises toluene.

9. The solution of any one of paragraphs 1-8, wherein the organoaluminum compound comprises at least one compound selected from the group consisting of a trialkylaluminum, a bis(dialkylaluminum) oxide, a dialkylaluminum hydride, a dialkylaluminum alkoxide, an alkylaluminum bisalkoxide, an aluminum trisalkoxide, a dialkylaluminum halide, an alkylaluminum dihalide, and any combination thereof.

10. The solution of any one of paragraphs 1-9, wherein the organoaluminum compound comprises at least one compound selected from the group consisting of a trialkylaluminum, a bis(dialkylaluminum) oxide, a dialkylaluminum hydride, and any combination thereof.

11. The solution of any preceding paragraph, wherein the organoaluminum compound comprises two or more alkyl groups, and the alkyl groups are $C_3$ or larger.

12. The solution of any preceding paragraph, wherein the organoaluminum compound comprises two or more alkyl groups, and the alkyl groups are $C_4$ or larger.

13. The solution of any preceding paragraph, wherein the organoaluminum compound comprises at least about 12 carbons per aluminum.

14. The solution of any preceding paragraph, wherein the organoaluminum compound comprises at least about 16 carbons per aluminum.

15. The solution of any preceding paragraph, wherein the aliphatic hydrocarbon solvent comprises a linear, branched, cyclic, or branched cyclic aliphatic hydrocarbon having 9 or fewer carbons.

16. The solution of any preceding paragraph, wherein the aliphatic hydrocarbon solvent comprises a linear, branched, cyclic, or branched cyclic aliphatic hydrocarbon having 5 to 7 carbons.

17. The solution of any preceding paragraph, wherein the aliphatic hydrocarbon solvent is methylcyclohexane, isohexane, or any combination thereof.

18. The solution of any preceding paragraph, wherein the solution consists essentially of the non-metallocene transition metal complex, the aliphatic hydrocarbon solvent, and the organoaluminum compound.

19. A catalyst system comprising:

the solution of any one of paragraphs 1-18; and at least one activator effective to activate the non-metallocene transition metal complex.

20. The catalyst system of paragraph 19, wherein the at least one activator comprises an activator selected from the group consisting of an alumoxane, a non-coordinating anion activator, and any combination thereof.

21. The catalyst system of paragraph 20, wherein the non-coordinating anion activator comprises an anion portion selected from the group consisting of tetrakis(perfluorophenyl)borate, tetrakis(perfluoronaphthyl)borate, and tetrakis (perfluorobiphenyl)borate.

22. The catalyst system of any one of paragraphs 19-21, wherein the catalyst system comprises at most about 5 ppm aromatic solvent.

23. The catalyst system of paragraph 22, wherein the aromatic solvent comprises toluene.

24. A method comprising:
contacting the catalyst system of any one of paragraphs 17-21 with an olefinic feed comprising one or more olefins under polymerization reaction conditions to form a polyolefin.

25. The method of paragraph 24, wherein contacting takes place in a substantial absence of aromatic solvent.

26. The method of paragraph 25, wherein the aromatic solvent comprises toluene.

27. The method of any one of paragraphs 24-26, wherein the one or more olefins comprise at least one alpha olefin.

28. The method of any one of paragraphs 23-27, wherein contacting takes place under solution polymerization conditions.

The present disclosure also relates to:

1A. A solution comprising:
a non-metallocene transition metal complex dissolved in an aliphatic hydrocarbon solvent at a concentration ranging from about 2 mM to about 20 mM at 23° C. in the presence of an organoaluminum compound;
wherein a molar ratio of aluminum of the organoaluminum compound to transition metal of the non-metallocene transition metal complex is about 1:1 or greater, and the organoaluminum compound comprises at least about 8 carbons per aluminum; and
wherein the non-metallocene transition metal complex has an aliphatic hydrocarbon solubility of less than 2 mM in an absence of the organoaluminum compound.

2A. The solution of paragraph 1A, wherein a reaction product of the non-metallocene transition metal complex and the organoaluminum compound or an adduct of the non-metallocene transition metal complex and the organoaluminum compound is dissolved in the aliphatic solvent.

3A. The solution of paragraph 1A, wherein the non-metallocene transition metal complex has a structure represented by $LM(X)_2$;
wherein M is a transition metal, L is a dianionic ligand coordinated to M, and X is an anionic group containing six or fewer non-hydrogen atoms, or two Xs are joined to form a ring defining a chelating ligand, a diene ligand or an alkylidene ligand.

4A. The solution of paragraph 3A, wherein each X is a $C_1$-$C_6$ hydrocarbyl group.

5A. The solution of paragraph 3A, wherein each X is a methyl group.

6A. The solution of any one of paragraphs 1A-5A, wherein the non-metallocene transition metal complex comprises at least one complex selected from the group consisting of a pyridyldiamide, a quinolinoyldiamide, a bis(phenolate), and a heterocyclic amide complex.

7A. The solution of any one of paragraphs 1A-5A, wherein the solution comprises at most about 5 ppm aromatic solvent.

8A. The solution of paragraph 7A, wherein the aromatic solvent comprises toluene.

9A. The solution of any one of paragraphs 1A-5A, wherein the organoaluminum compound comprises at least one compound selected from the group consisting of a trialkylaluminum, a bis(dialkylaluminum) oxide, a dialkylaluminum hydride, a dialkylaluminum alkoxide, an alkylaluminum bisalkoxide, an aluminum trisalkoxide, a dialkylaluminum halide, an alkylaluminum dihalide, and any combination thereof.

10A. The solution of paragraph 7A, wherein the organoaluminum compound comprises at least one compound selected from the group consisting of a trialkylaluminum, a bis (dialkylaluminum) oxide, a dialkylaluminum hydride, and any combination thereof.

11A. The solution of any one of paragraphs 1A-5A, wherein the organoaluminum compound comprises two or more alkyl groups, and the alkyl groups are $C_3$ or larger.

12A. The solution of paragraph 7A, wherein the organoaluminum compound comprises two or more alkyl groups, and the alkyl groups are $C_4$ or larger.

13A. The solution of any one of paragraphs 1A-5A, wherein the organoaluminum compound comprises at least about 12 carbons per aluminum.

14A. The solution of paragraph 7A, wherein the organoaluminum compound comprises at least about 16 carbons per aluminum.

15A. The solution of any one of paragraphs 1A-5A, wherein the aliphatic hydrocarbon solvent comprises a linear, branched, cyclic, or branched cyclic aliphatic hydrocarbon having 9 or fewer carbons.

16A. The solution of paragraph 7A, wherein the aliphatic hydrocarbon solvent comprises a linear, branched, cyclic, or branched cyclic aliphatic hydrocarbon having 5 to 7 carbons.

17A. The solution of any one of paragraphs 1A-5A, wherein the aliphatic hydrocarbon solvent is methylcyclohexane, isohexane, or any combination thereof.

18A. The solution of any one of paragraphs 1A-5A, wherein the solution consists essentially of the non-metallocene transition metal complex, the aliphatic hydrocarbon solvent, and the organoaluminum compound.

19A. A catalyst system comprising:
the solution of paragraph 1A; and
at least one activator effective to activate the non-metallocene transition metal complex.

20A. The catalyst system of paragraph 19A, wherein the at least one activator comprises an activator selected from the group consisting of an alumoxane, a non-coordinating anion activator, and any combination thereof.

21A. The catalyst system of paragraph 20A, wherein the non-coordinating anion activator comprises an anion portion selected from the group consisting of tetrakis(perfluorophenyl)borate, tetrakis(perfluoronaphthyl)borate, and tetrakis (perfluorobiphenyl)borate.

22A. The catalyst system of any one of paragraphs 19A-21A, wherein the catalyst system comprises at most about 5 ppm aromatic solvent.

23A. The catalyst system of paragraph 22A, wherein the aromatic solvent comprises toluene.

24A. A method comprising:
contacting the catalyst system of paragraph 17A with an olefinic feed comprising one or more olefins under polymerization reaction conditions to form a polyolefin.

25A. The method of paragraph 24A, wherein contacting takes place in a substantial absence of aromatic solvent.

26A. The method of paragraph 25A, wherein the aromatic solvent comprises toluene.

27A. The method of any one of paragraphs 24A-26A, wherein the one or more olefins comprise at least one alpha olefin.

28A. The method of any one of paragraphs 23A-26A, wherein contacting takes place under solution polymerization conditions.

29A. The method of paragraph 27A, wherein contacting takes place under solution polymerization conditions.

The present disclosure further relates to:

1B. A solution comprising:
  a non-metallocene transition metal complex dissolved in an aliphatic hydrocarbon solvent at a concentration ranging from about 2 mM to about 20 mM at 23° C. in the presence of an organoaluminum compound;
  wherein a molar ratio of aluminum of the organoaluminum compound to transition metal of the non-metallocene transition metal complex is about 1:1 or greater, and the organoaluminum compound comprises at least about 8 carbons per aluminum; and
  wherein the non-metallocene transition metal complex has an aliphatic hydrocarbon solubility of less than 2 mM in an absence of the organoaluminum compound.

2B. The solution of paragraph 1B, wherein a reaction product of the non-metallocene transition metal complex and the organoaluminum compound or an adduct of the non-metallocene transition metal complex and the organoaluminum compound is dissolved in the aliphatic solvent.

3B. The solution of paragraph 1B, wherein the non-metallocene transition metal complex has a structure represented by $LM(X)_2$;
  wherein M is a transition metal, L is a dianionic ligand coordinated to M, and X is an anionic group containing six or fewer non-hydrogen atoms, or two Xs are joined to form a ring defining a chelating ligand, a diene ligand or an alkylidene ligand.

4B. The solution of paragraph 3B, wherein each X is a $C_1$-$C_6$ hydrocarbyl group.

5B. The solution of paragraph 3B, wherein each X is a methyl group.

6B. The solution of paragraph 1B, wherein the non-metallocene transition metal complex comprises at least one complex selected from the group consisting of a pyridyldiamide, a quinolinoyldiamide, a bis(phenolate), and a heterocyclic amide complex.

7B. The solution of paragraph 1B, wherein the solution comprises at most about 5 ppm aromatic solvent.

8B. The solution of paragraph 7B, wherein the aromatic solvent comprises toluene.

9B. The solution of paragraph 1B, wherein the organoaluminum compound comprises at least one compound selected from the group consisting of a trialkylaluminum, a bis(dialkylaluminum)oxide, a dialkylaluminum hydride, a dialkylaluminum alkoxide, an alkylaluminum bisalkoxide, an aluminum trisalkoxide, a dialkylaluminum halide, an alkylaluminum dihalide, and any combination thereof.

10B. The solution of paragraph 7B, wherein the organoaluminum compound comprises at least one compound selected from the group consisting of a trialkylaluminum, a bis(dialkylaluminum) oxide, a dialkylaluminum hydride, and any combination thereof.

11B. The solution of paragraph 1B, wherein the organoaluminum compound comprises two or more alkyl groups, and the alkyl groups are $C_3$ or larger.

12B. The solution of paragraph 7B, wherein the organoaluminum compound comprises two or more alkyl groups, and the alkyl groups are $C_4$ or larger.

13B. The solution of paragraph 1B, wherein the organoaluminum compound comprises at least about 12 carbons per aluminum.

14B. The solution of paragraph 7B, wherein the organoaluminum compound comprises at least about 16 carbons per aluminum.

15B. The solution of paragraph 1B, wherein the aliphatic hydrocarbon solvent comprises a linear, branched, cyclic, or branched cyclic aliphatic hydrocarbon having 9 or fewer carbons.

16B. The solution of paragraph 7B, wherein the aliphatic hydrocarbon solvent comprises a linear, branched, cyclic, or branched cyclic aliphatic hydrocarbon having 5 to 7 carbons.

17B. The solution of paragraph 1B, wherein the aliphatic hydrocarbon solvent is methylcyclohexane, isohexane, or any combination thereof.

18B. The solution of paragraph 1B, wherein the solution consists essentially of the non-metallocene transition metal complex, the aliphatic hydrocarbon solvent, and the organoaluminum compound.

19B. A catalyst system comprising:
  the solution of paragraph 1B; and
  at least one activator effective to activate the non-metallocene transition metal complex.

20B. The catalyst system of paragraph 19B, wherein the at least one activator comprises an activator selected from the group consisting of an alumoxane, a non-coordinating anion activator, and any combination thereof.

21B. The catalyst system of paragraph 20B, wherein the non-coordinating anion activator comprises an anion portion selected from the group consisting of tetrakis(perfluorophenyl)borate, tetrakis(perfluoronaphthyl)borate, and tetrakis(perfluorobiphenyl)borate.

22B. The catalyst system of paragraph 19B, wherein the catalyst system comprises at most about 5 ppm aromatic solvent.

23B. The catalyst system of paragraph 22B, wherein the aromatic solvent comprises toluene.

24B. A method comprising:
  contacting the catalyst system of paragraph 17B with an olefinic feed comprising one or more olefins under polymerization reaction conditions to form a polyolefin.

25B. The method of paragraph 24B, wherein contacting takes place in a substantial absence of aromatic solvent.

26B. The method of paragraph 25B, wherein the aromatic solvent comprises toluene.

27B. The method of paragraph 24B, wherein the one or more olefins comprise at least one alpha olefin.

28B. The method of paragraph 24B, wherein contacting takes place under solution polymerization conditions.

29B. The method of paragraph 27B, wherein contacting takes place under solution polymerization conditions.

To facilitate a better understanding of the embodiments of the present disclosure, the following examples of preferred or representative embodiments are given. In no way should the following examples be read to limit, or to define, the scope of the invention.

EXAMPLES

Triethylaluminum (TEAL), triisobutylaluminum (TIBAL), and diisobutylaluminum hydride (DIBALH) were purchased from Sigma Aldrich. Tri-n-octylaluminum (TNOA), bis(diisobutylaluminum)oxide (DIBALO) as a hexane solution, and modified methylalumoxane type 3A (MMAO-3A) as a heptane solution were purchased from AkzoNobel. The MMAO-3A has an approximate molecular formula of $[OAl(Me)_{0.7}(i\text{-}Bu)_{0.3}]_n$. N,N-Dimethylanilinium tetrakis(perfluorophenyl)borate (DMAH-BF20) was purchased from Albemarle. Di(hydrogenated tallow)methylammonium tetrakis(perfluorophenyl)borate (M2HTH-BF20, as a 10 wt % solution in methylcyclohexane), was purchased from Boulder Scientific. Unless stated otherwise the quantities of organoaluminum compounds, DIBALO and methylalumoxanes are presented based on the mmols of Al metal. Thus, a 75 nmol quantity of molecular DIBALO contains 150 nmol of Al.

A quinolinyldiamido complex having a structure represented by Formula (4) above (CAT-1) was prepared as described in US Pat. Appl. No. 2018/0002352. A pyridyldiamido complex having a structure represented by Formula (2) above (CAT-2) was prepared as described in U.S. Pat. No. 9,290,519. Diethylenetriamine complexes having structures represented by Formulas (14) and (15) (complexes CAT-3 and CAT-4, respectively) were prepared by reaction of $N^1$-(2,3,4,5,6-pentamethylphenyl)-$N^2$-(2-((2,3,4,5,6-pentamethylphenyl)amino)ethyl)ethane-1,2-diamine with ZrBn4 and HfBn₄, respectively.

Formula (14)

Formula (15)

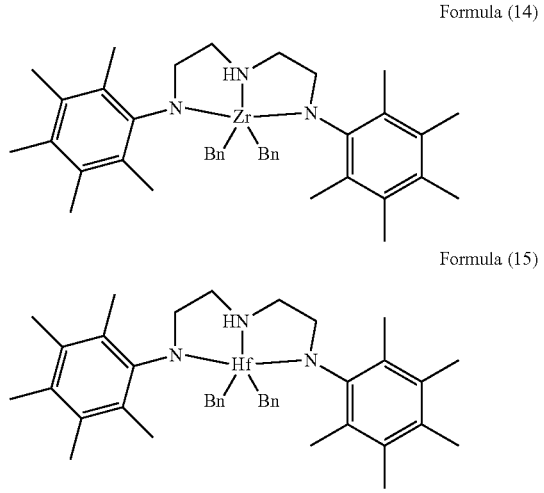

$N^1$-(2,3,4,5,6-pentamethylphenyl)-$N^2$-(2-((2,3,4,5,6-pentamethylphenyl)amino)ethyl)ethane-1,2-diamine was prepared as described in U.S. Pat. No. 8,501,659. Unless stated otherwise all manipulations and reactions were performed in a nitrogen filled drybox at about 23° C. ambient temperature.

Example 1: Solubility Testing

Solubility of CAT-1 in Isohexane without Added Organoaluminum Compound. Finely divided CAT-1 (60 mg) was loaded into a 20 mL glass scintillation vial. A Teflon-coated stirbar (12.7 mm×3.2 mm) and isohexane (~10 mL) were then added. The mixture was capped and stirred rapidly (1,000 rpm) for 60 minutes to achieve saturation. At this time the mixture was heterogeneous with both orange solid and orange solution visible when the mixture was allowed to settle. A portion of the mixture was then filtered through a 60 micron Teflon filter into a tared vial. Weighing the vial indicated that the solution weighed 6.824 g. The volatiles were then evaporated under a stream of nitrogen and the orange residue was dried under reduced pressure. Weighing the vial afterward showed that the residue solid weighed 0.0082 g. Thus, CAT-1 exhibited a maximum solubility in isohexane at 23° C. of 0.12 wt %, which is equivalent to 1.1 mM.

General Procedure for Solubility Determination in the Presence of an Organoaluminum Compound. A set amount of the transition metal complex was loaded into a tared 20 mL glass scintillation vial. A Teflon-coated stirbar (12.7 mm×3.2 mm) and isohexane were then added. The mixture was capped and stirred rapidly (800-1,000 rpm) for 30 minutes. An observation was made regarding whether insolubles were present. In all cases, the complexes were largely insoluble at this time, as inspected visually based upon the large amount of undissolved solids. An alkylaluminum or other organoaluminum compound was then added, and the mixture was re-capped and stirred rapidly at 800-1,000 rpm. The vial was monitored periodically to determine if the solids dissolved to form a homogeneous solution. Results are summarized in Tables 3 and 4 below.

Table 3 shows screening results to identify organoaluminum compounds effective to promote solubilization of CAT-1. The target concentration was 10 mM in each case, assuming complete solubility.

TABLE 3

|  | Entry 1 | Entry 2 | Entry 3 | Entry 4 |
| --- | --- | --- | --- | --- |
| Amount of CAT-1 (mmol) | 0.050 | 0.050 | 0.050 | 0.050 |
| Isohexane (mL) | 5.00 | 5.00 | 5.00 | 5.00 |
| Other Solvent (mL) | — | — | — | — |
| Organoaluminum | TEAL | TNOA | TNOA | TIBAL |
| Organoaluminum Amount (mmol of Al) | 0.150 | 0.150 | 0.500 | 0.150 |
| Molar Ratio (Al:Transition Metal) | 3:1 | 3:1 | 10:1 | 3:1 |
| Sol. Prior to Al addition | insoluble | insoluble | insoluble | insoluble |
| Sol. 20 min after Al addition | insoluble | solution | solution | slightly cloudy |
| Sol. 40 min after Al addition | insoluble | solution | solution | solution |
| Sol. 24 hours after Al addition | insoluble | solution | solution | solution |

|  | Entry 5 | Entry 6 | Entry 7 | Entry 8 |
| --- | --- | --- | --- | --- |
| Amount of CAT-1 (mmol) | 0.050 | 0.050 | 0.050 | 0.050 |
| Isohexane (mL) | 4.85 | 4.92 | 4.73 | 4.84 |
| Other Solvent (mL) | hexane (0.15 mL) | heptane (0.08 mL) | heptane (0.27 mL) | hexane (0.16 mL) |
| Organoaluminum | DIBALH | MMAO-3A | MMAO-3A | DIBALO |
| Organoaluminum Amount (mmol of Al) | 0.150 | 0.150 | 0.500 | 0.150 |
| Molar Ratio (Al:Transition Metal) | 3:1 | 3:1 | 10:1 | 3:1 |
| Sol. Prior to Al addition | insoluble | insoluble | insoluble | insoluble |
| Sol. 20 min after Al addition | solution | insoluble | insoluble | insoluble |
| Sol. 40 min after Al addition | solution | insoluble | insoluble | insoluble |
| Sol. 24 hours after Al addition | solution | insoluble | insoluble | solution |

As shown in Table 3, 3 molar equivalents of TEAL (Entry 1) was ineffective for solubilizing CAT-1. In contrast, either 3 or 10 molar equivalents of TNOA (Entries 2 and 3) yielded homogeneous solutions within 20 minutes. 3 Molar equivalents of TIBAL (Entry 4) gave a slightly cloudy mixture after stirring for 20 minutes, but a homogeneous solution was obtained after stirring for 40 minutes or more. 3 Molar equivalents of DIBAL-H (Entry 5) gave a homogeneous solution within 20 minutes. Either 3 or 10 molar equivalents of MMAO-3A (Entries 6 and 7) were ineffective for solubilizing CAT-1. 3 molar equivalents of DIBALO (Entry 8), failed to promote solubility at 40 minutes, but a homogeneous orange solution was obtained after stirring for 24 hours, with only a trace of residue adhering to the wall of the vial. As shown, organoaluminum compounds having at least two alkyl groups per aluminum that contain 4 or more carbon atoms are effective for solubilizing CAT-1.

Table 4 shows solubility testing results using TNOA to promote solubilization of CAT-2, CAT-3 and CAT-4. The target concentration was 10 mM in each case, assuming complete solubility.

TABLE 4

|  | Entry 9 | Entry 10 | Entry 11 |
| --- | --- | --- | --- |
| Catalyst Complex | CAT-2 | CAT-3 | CAT-4 |
| Amount of Catalyst Complex (mmol) | 0.050 | 0.050 | 0.050 |
| Isohexane (mL) | 5.00 | 5.00 | 5.00 |
| Other Solvent (mL) | — | — | — |
| Organoaluminum | TNOA | TNOA | TNOA |
| Organoaluminum Amount (mmol of Al) | 0.150 | 0.150 | 0.500 |
| Molar Ratio (Al:Transition Metal) | 3:1 | 3:1 | 3:1 |
| Sol. Prior to Al addition | insoluble | insoluble | insoluble |
| Sol. 30 min after Al addition | solution | insoluble | insoluble |
| Sol. 24 hours after Al addition | solution | insoluble | insoluble |

Whereas TNOA was effective for solubilizing CAT-1 and CAT-2 within 30 minutes, no solubilization of CAT-3 and CAT-4 occurred. Without being bound by theory or mechanism, it is believed that steric bulk of the benzyl groups within CAT-3 and CAT-4 prevents the organoaluminum compound from interacting effectively with the transition metal complex.

Example 2: Initial Polymerization Reaction Testing

Octene Homopolymeization. At ambient temperature and pressure, a tared vial was loaded with 1-octene (1 mL, 0.715 g). Separately, a 1 mM solution of bis(hydrogenated tallow) methylammonium tetrakis(perfluorophenyl)borate (M2HTH-BF20) activator was prepared by dilution of a 10 wt % methylcyclohexane solution of M2HTH-BF20 with hexane. The 1 mM solution (0.200 mL, 200 nmol) was then added to the vial. The vial was swirled to mix the contents, and an aliquot of a transition metal complex in an aliphatic hydrocarbon solvent was added (0.0400 mL, 200 nmol), as specified in Table 5 below. The mixture was again swirled to mix the contents, and after 30 minutes of reaction, volatile materials were removed at 150° C. with a stream of nitrogen. The polymer yield is reported as the mass of insoluble material. The reaction was conducted at ambient temperature and pressure.

TABLE 5

|  | Run 2A | Run 2B | Run 2C |
| --- | --- | --- | --- |
| CAT-1 Catalyst Solution | Example 1 (Entry 2) | Example 1 (Entry 4) | Example 1 (Entry 5) |
| Amount of Catalyst (nmol) | ~200 | ~200 | ~200 |
| Organoaluminum Compound | TNOA | TIBAL | DIBALH |
| Activator | M2HTH-BF20 | M2HTH-BF20 | M2HTH-BF20 |
| Amount of Activator (nmol) | ~200 | ~200 | ~200 |
| Polymer Yield (g) | 0.63 | 0.68 | 0.37 |

As shown, the polymer yield was somewhat lower when the organoaluminum compound was DIBALH as compared to TIBAL and TNOA, which afforded fairly similar polymer yields.

Example 3: High-Throughput Polymerization Reaction Testing

General High-Throughput Polymerization Procedures. More detailed olefin polymerization catalyst screening was performed in a parallel pressure reactor (PPR) as generally described in U.S. Pat. Nos. 6,306,658; 6,455,316; and 6,489,168; International Patent Application Publication WO 2000/009255; and J. Am. Chem. Soc., 2003, v. 125, pp. 4306-4317, each of which is fully incorporated herein by reference to the extent not inconsistent with this specification. Catalysts were screened for their ability to produce homopolypropylene.

A 0.8 mM solution of CAT-1 in toluene (Solution 1, comparative) was prepared at ambient temperature by addition of an appropriate amount of toluene to a known quantity of CAT-1. A 10 mM solution of CAT-1/TNOA in isohexane was prepared at ambient temperature using a procedure identical to that described in Example 1 (Table 3, Entry 2). An aliquot of this mixture was diluted to 0.80 mM with isohexane to form Solution 2 (inventive). Solution 1 and Solution 2 were used in the polymerization reactions described below. Activator solutions (each 0.80 mM) used in the polymerization reactions were prepared by dissolving DMAH-BF20 in toluene or by diluting a 10 wt % methylcyclohexane solution of M2HTH-BF20 with isohexane at ambient temperature.

The following general polymerization procedures were used. Specific polymerization reaction conditions and testing results are given each table below. A pre-weighed glass vial insert and disposable stirring paddle were fitted to each reaction vessel of the reactor, which contains 48 individual reaction vessels. The reactor was purged with propylene gas. A volume of isohexane was then injected into each reaction vessel to bring the total reaction volume to the desired volume (5 mL), taking into account any subsequent additions. The reactor was then closed, and each vessel was individually heated and pressurized with gaseous monomer to the target temperature and pressure. The vessel contents were then stirred at 800 rpm. A scavenger solution (t10 mM TNOA in isohexane) was then added along with a solvent flush (typically 500 microliters) of isohexane. The activator solution (added in a volume sufficient to provide 1.1 molar equivalents of activator relative to the transition metal complex to be subsequently added) was then injected into the reaction vessel along with a solvent flush (typically 500 microliters) in isohexane. A solution of the dissolved transition metal complex was then added along with a solvent flush (typically 500 microliters) of isohexane.

The reaction was then allowed to proceed until either a set pressure decrease occurred (typically 3 psi=0.035 MPa for propylene polymerizations) or a set amount of time had passed (typically 20 minutes). At this point, the reaction was quenched by pressurizing the reaction vessel with compressed air. The glass vial insert containing the polymer product and solvent was then removed from the reactor, and volatile components were removed using a Genevac HT-12 centrifuge and Genevac $VC_{3000}D$ vacuum evaporator operating at elevated temperatures and reduced pressure (~60° C. and 18 mbar). The vial was then weighed to determine the yield of polymer product.

Propylene Polymerization. Propylene homopolymerization reactions were conducted at 100° C. and 150 psi using ~40 nmol of transition metal complex (CAT-1), ~1.1. molar equivalents of activator, and 500 nM of TNOA scavenger in isohexane solvent at a total reaction volume of 5 mL. Propylene polymerization data is provided in Table 6 below.

TABLE 6

| Run | Catalyst Solution | Activator | Reaction Time (s) | Yield (mg) | Catalyst Activity (kg/mmol/h) |
|---|---|---|---|---|---|
| 3-1 | Solution 1 | DMAH-BF20 | 61 | 108 | 158 |
| 3-2 | Solution 1 | DMAH-BF20 | 66 | 113 | 153 |
| 3-3 | Solution 1 | DMAH-BF20 | 67 | 106 | 142 |
| 3-4 | Solution 1 | DMAH-BF20 | 95 | 105 | 100 |
| Avg. | | | | | 138 ± 27 |
| 3-5 | Solution 2 | DMAH-BF20 | 53 | 94 | 159 |
| 3-6 | Solution 2 | DMAH-BF20 | 77 | 119 | 140 |
| 3-7 | Solution 2 | DMAH-BF20 | 83 | 122 | 133 |
| 3-8 | Solution 2 | DMAH-BF20 | 74 | 107 | 129 |
| Avg. | | | | | 140 ± 13 |
| 3-9 | Solution 1 | M2HTH-BF20 | 53 | 98 | 166 |
| 3-10 | Solution 1 | M2HTH-BF20 | 96 | 141 | 132 |
| 3-11 | Solution 1 | M2HTH-BF20 | 86 | 106 | 112 |
| 3-12 | Solution 1 | M2HTH-BF20 | 78 | 103 | 119 |
| Avg. | | | | | 132 ± 24 |
| 3-13 | Solution 2 | M2HTH-BF20 | 77 | 115 | 135 |
| 3-14 | Solution 2 | M2HTH-BF20 | 82 | 119 | 131 |
| 3-15 | Solution 2 | M2HTH-BF20 | 91 | 120 | 119 |
| 3-16 | Solution 2 | M2HTH-BF20 | 82 | 115 | 127 |
| Avg. | | | | | 128 ± 7 |

As shown, the polymer yields and catalyst activities were essentially equivalent to one another for a given activator for reactions conducted using CAT-1 solutions prepared either in toluene (Solution 1) or in isohexane in the presence of an organoaluminum (Solution 2). Similarly, the polymers produced using Solution 1 and Solution 2 were similar in molecular weight and melting point.

The polymer was analyzed by Rapid GPC, as described below, to determine the molecular weight, and by differential scanning calorimetry (DSC) to determine the melting point. Characterization data for the polymers is supplied in Table 7.

To determine various molecular weight related values by GPC, high temperature size exclusion chromatography was performed using an automated "Rapid GPC" system as generally described in U.S. Pat. Nos. 6,491,816; 6,491,823; 6,475,391; 6,461,515; 6,436,292; 6,406,632; 6,175,409; 6,454,947; 6,260,407; and 6,294,388. This apparatus has a series of three 30 cm×7.5 mm linear columns, each containing PLgel 10 um, Mix B. The GPC system was calibrated using polystyrene standards ranging from 580 g/mol-3,390,000 g/mol. The system was operated at an eluent flow rate of 2.0 mL/min and an oven temperature of 165° C. 1,2,4-trichlorobenzene was used as the eluent. The polymer samples were dissolved in 1,2,4-trichlorobenzene at a concentration of 0.1-0.9 mg/mL. 250 µL of a polymer solution was injected into the system. The concentration of the polymer in the eluent was monitored using an evaporative light scattering detector. The molecular weights presented in the examples are relative to linear polystyrene standards.

Differential Scanning Calorimetry (DSC) measurements were performed on a TA-Q100 instrument to determine the melting point of the polymers. Samples were pre-annealed at 220° C. for 15 minutes and then allowed to cool to room temperature overnight. The samples were then heated to 220° C. at a rate of 100° C./minute and then cooled at a rate of 50° C./min. Melting points were collected during the heating period.

TABLE 7

| Run | Mn | Mw | Mz | Mw/Mn | Tm (° C.) |
|---|---|---|---|---|---|
| 3-1 | 134,787 | 249,305 | 555,452 | 1.9 | 107.8 |
| 3-2 | 132,443 | 247,852 | 533,144 | 1.9 | 107.2 |
| 3-3 | 159,972 | 273,959 | 599,473 | 1.7 | 107.0 |
| 3-4 | 130,495 | 250,604 | 567,459 | 1.9 | 108.0 |
| 3-5 | 110,946 | 230,477 | 540,350 | 2.1 | 106.3 |
| 3-6 | 180,521 | 317,521 | 695,988 | 1.8 | 105.7 |
| 3-7 | 154,212 | 285,110 | 653,104 | 1.8 | 107.5 |
| 3-8 | 159,423 | 288,024 | 629,367 | 1.8 | 107.0 |
| 3-9 | 154,985 | 278,575 | 574,070 | 1.8 | 107.3 |
| 3-10 | 158,195 | 296,012 | 642,582 | 1.9 | 106.7 |
| 3-11 | 136,741 | 283,622 | 647,750 | 2.1 | 108.0 |
| 3-12 | 147,142 | 273,686 | 677,747 | 1.9 | 108.1 |
| 3-13 | 162,162 | 290,635 | 646,613 | 1.8 | 106.7 |
| 3-14 | 179,711 | 311,644 | 677,689 | 1.7 | 106.7 |
| 3-15 | 148,370 | 284,738 | 668,602 | 1.9 | 106.6 |
| 3-16 | 171,572 | 306,242 | 707,860 | 1.8 | 107.5 |

Example 4: Continuous Polymerization Data

General Description of Continuous Polymerizations: Polymerizations were carried out in a continuous stirred tank reactor system at a pressure of about 2.7 MPa/g unless otherwise mentioned. Additional polymerization conditions and product characterization data is provided in Table 8 below.

A 1-L autoclave reactor was equipped with a stirrer, a pressure controller, and a water cooling/steam heating element with a temperature controller. The reactor was operated in liquid fill condition at a reactor pressure in excess of the bubbling point pressure of the reactant mixture, thereby keeping the reactants in liquid phase. Isohexane and propylene were pumped into the reactors by Pulsa feed pumps. All liquid flow rates were controlled using a Coriolis mass flow controller (Quantim series from Brooks). Ethylene and hydrogen were each flowed as a gas under its own pressure through a Brooks flow controller. Monomers (e.g., ethylene and propylene) and hydrogen feeds were combined into a single stream and then mixed with a pre-chilled isohexane stream that had been cooled to 10° C. or less. The mixture was then fed to the reactor through a single line. Scavenger solution (TNOA) was also added to the combined solvent and monomer stream just before it entered the reactor to limit the effect of any catalyst poisons. Catalyst solution was separately fed to the reactor using an ISCO syringe pump.

Isohexane and monomers (e.g., ethylene and propylene) were purified over beds of alumina and molecular sieves. Toluene (when used) for preparing catalyst solutions was purified by the same technique.

The polymer produced in the reactor exited through a back pressure control valve that reduced the pressure to atmospheric. The pressure reduction caused the unconverted monomers in the solution to flash into a vapor phase which was vented from the top of a vapor liquid separator. The liquid phase, comprising mainly polymer and solvent, was then collected for polymer recovery. The collected samples were first air-dried in a hood to evaporate most of the solvent, and then dried in a vacuum oven at a temperature of about 90° C. for about 12 hours before determining yields.

Melt flow rate (MFR) of the polymer samples was measured according to ASTM D-1238 using 2.16 kg weight at 230° C. High load melt flow rates (HLMFR) were measured similarly using 21.6 kg of weight at the same temperature.

Runs C-9 to C-11 followed the same procedure used for Runs C-01 to C-04 except M2HTH-BF20 was dissolved in isohexane as the cocatalyst solution.

Runs C-12 to C-13 followed the same procedure used for Runs C-01 to C-04 except N-methyl-4-nonadecyl-N-octadecylanilium tetrakis(pentafluorophenyl)borate (NOMAH-BF20) was dissolved in isohexane as the cocatalyst solution.

TABLE 8

| Run # | C-01 | C-02 | C-03 | C-04 |
|---|---|---|---|---|
| Polymerization temperature (° C.) | 85 | 90 | 95 | 100 |
| Ethylene feed rate (g/min) | 0.90 | 0.90 | 0.90 | 0.90 |
| Propylene feed rate (g/min) | 14.0 | 14.0 | 14.0 | 14.0 |
| Isohexane Feed rate (g/min) | 39.0 | 39.0 | 39.0 | 39.0 |
| H2 feed rate (mg/min) | 0.425 | 0.425 | 0.425 | 0.425 |
| Catalyst feed rate (mol/min) | $6.07 \times 10^{-8}$ | $6.07 \times 10^{-8}$ | $6.07 \times 10^{-8}$ | $6.07 \times 10^{-8}$ |
| Scavenger rate (mol/min) | $1.21 \times 10^{-6}$ | $1.21 \times 10^{-6}$ | $1.21 \times 10^{-6}$ | $1.21 \times 10^{-6}$ |
| Conversion (%) | 14.44% | 16.36% | 14.19% | 16.34% |
| Catalyst efficiency (kg poly/kg cat) | 48,413 | 54,863 | 47,588 | 54,788 |
| Ethylene content (wt %) | 27.0% | 24.9% | 27.1% | 25.4% |
| Melt flow rate (MFR) (g/10 min) |  | 0.1 |  |  |
| HLMFR (g/10 min) | 2.2 | 10.9 | 5.7 | 7.1 |

| Run # | C-05 | C-06 | C-07 | C-08 |
|---|---|---|---|---|
| Polymerization temperature (° C.) | 85 | 90 | 95 | 100 |
| Ethylene feed rate (g/min) | 0.90 | 0.90 | 0.90 | 0.90 |
| Propylene feed rate (g/min) | 14.0 | 14.0 | 14.0 | 14.0 |
| Isohexane feed rate (g/min) | 39.5 | 39.5 | 39.5 | 39.5 |
| H2 feed rate (mg/min) | 0.425 | 0.425 | 0.425 | 0.425 |
| Catalyst feed rate (mol/min) | $6.07 \times 10^{-8}$ | $6.07 \times 10^{-8}$ | $6.07 \times 10^{-8}$ | $6.07 \times 10^{-8}$ |
| Scavenger rate (mol/min) | $1.82 \times 10^{-6}$ | $1.82 \times 10^{-6}$ | $1.82 \times 10^{-6}$ | $1.82 \times 10^{-6}$ |
| Conversion (%) | 42.40% | 37.10% | 43.90% | 37.90% |
| Catalyst efficiency (kg poly/kg cat) | 142,050 | 124,275 | 147,263 | 127,238 |
| Ethylene content (wt %) | 13.5% | 14.9% | 12.9% | 14.7% |
| MFR (g/10 min) | 2.5 | 2.9 | 0.7 | 1.3 |
| HLMFR (g/10 min) | 124.2 | 125.0 | 29.9 | 71.8 |

| Run # | C-09 | C-10 | C-11 | C-12 | C-13 |
|---|---|---|---|---|---|
| Polymerization temperature (° C.) | 85 | 95 | 105 | 85 | 95 |
| Ethylene feed rate (g/min) | 0.90 | 0.90 | 0.90 | 0.90 | 0.90 |
| Propylene feed rate (g/min) | 14.0 | 14.0 | 14.0 | 14.0 | 14.0 |
| Isohexane feed rate (g/min) | 39.5 | 39.5 | 39.5 | 39.5 | 39.5 |
| H2 feed rate (mg/min) | 0.425 | 0.425 | 0.425 | 0.425 | 0.425 |
| Catalyst feed rate (mol/min) | $6.07 \times 10^{-8}$ | $6.07 \times 10^{-8}$ | $6.07 \times 10^{-8}$ | $9.10 \times 10^{-8}$ | $9.10 \times 10^{-8}$ |
| Scavenger rate (mol/min) | $1.82 \times 10^{-6}$ | $1.82 \times 10^{-6}$ | $1.82 \times 10^{-6}$ | $1.82 \times 10^{-6}$ | $1.82 \times 10^{-6}$ |
| Conversion (%) | 18.30% | 18.30% | 15.60% | 32.90% | 32.90% |
| Catalyst efficiency (kg poly/kg cat) | 61,275 | 61,538 | 52,350 | 35,125 | 39,400 |
| Ethylene content (wt %) | 24.8% | 25.0% | 27.5% |  |  |
| MFR (g/10 min) | 1.6 | 2.0 | 3.9 |  |  |
| HLMFR (g/10 min) | 43.2 | 72.1 | 110.7 |  |  |

Ethylene content was determined by FTIR using ASTM D3900.

In Runs C-01 to C-04, CAT-1 and tri-n-octylaluminum (TNOA) (25 wt % in hexane, Sigma Aldrich) were dissolved in isohexane as the catalyst solution at a molar ratio of TNOA to CAT-1 of 20:1. N,N-dimethylanilinium tetrakis (pentafluorophenyl)borate (DMAH-BF20) was dissolved in toluene as the cocatalyst solution. The molar ratio of catalyst to cocatalyst was 0.98:1. The catalyst solution and cocatalyst solution were fed into reactor using separate lines. Additional TNOA was added as scavenger. The scavenger feed rate was adjusted to optimize the catalyst efficiency, and the feed rate varied from 0 (no scavenger) to 15 μmol/min. The catalyst feed rates were also adjusted according to the level of impurities in the system to reach the targeted conversions listed.

Runs C-05 to C-08 followed the same procedure used for Runs C-01 to C-04 except the molar ratio of TNOA to CAT-1 was only 3:1.

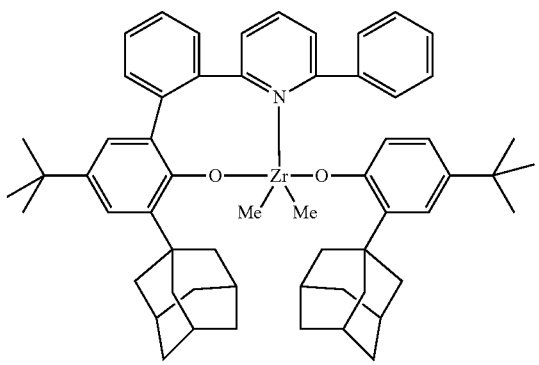

Complex 88

Complex 88 was prepared as described in US patent application US 2020/0255553.

Example 88-0

Solubility of complex 88 in isohexane (1.0 mM Zr target). Finely divided solid complex 88 (0.0180 g, 0.0197 mmol) was combined with isohexane (19.57 mL) in a scintillation vial. A stir bar was added and the mixture was capped. The heterogeneous mixture was then stirred rapidly (1000 rpm) at ambient temperature (22±2° C.). After 40 hours the mixture remained heterogeneous indicating that the practical solubility of complex 88 in isohexane was less than 1 mM.

Example 88-1

Solubility in isohexane of complex 88 with 5 equivalents tri(n-octyl)aluminum (2.0 mM Zr target). Finely divided solid complex 88 (0.0360 g, 0.0393 mmol) was combined with isohexane (19.62 mL) in a scintillation vial. A stir bar was added and the mixture was capped. The heterogeneous mixture was then stirred rapidly (1000 rpm) at ambient temperature (22±2° C.). After 5 hours the mixture remained heterogeneous indicating that the practical solubility of complex 88 in isohexane was less than 2 mM. To the heterogeneous mixture was then added tri(n-octyl)aluminum (0.197 mmol Al, 0.394 mL of 0.5 M solution in hexane). The mixture was stirred for 35 additional hours during which time all visible solids had dissolved to form a pale brown-tinted homogeneous solution indicating that the solubility of complex 88 in isohexane with 5 equivalents of tri(n-octyl) aluminum is at least 1.96 mM.

Example 88-3

Solubility in isohexane of complex 88 with 10 equivalents tri(n-octyl)aluminum (2.0 mM Zr target). Finely divided solid complex 88 (0.0287 g, 0.0313 mmol) was combined with isohexane (14.95 mL) and 25 wt % tri(n-octyl)aluminum in isohexane (0.459 g, 0.6548 mL, 0.313 mmol) in a scintillation vial. A stir bar was added and the mixture was capped. The heterogeneous mixture was then stirred rapidly (1000 rpm) at ambient temperature (22±2° C.). After 125 minutes all visible solids had dissolved to form a pale brown-tinted homogeneous solution indicating that the solubility of complex 88 in isohexane with 10 equivalents of tri(n-octyl)aluminum is at least 2.00 mM.

Example 88-4

Solubility in isohexane of complex 88 with 10 equivalents tri(n-octyl)aluminum (4.0 mM Zr target). Finely divided solid complex 88 (0.0287 g, 0.0313 mmol) was combined with isohexane (7.14 mL) and 25 wt % tri(n-octyl)aluminum in isohexane (0.459 g, 0.6548 mL, 0.313 mmol) in a scintillation vial. A stir bar was added and the mixture was capped. The heterogeneous mixture was then stirred rapidly (1000 rpm) at ambient temperature (22±2° C.). After 160 minutes all visible solids had dissolved to form a pale brown-tinted homogeneous solution indicating that the solubility of complex 88 in isohexane with 10 equivalents of tri(n-octyl)aluminum is at least 4.00 mM.

Example 88-5

Solubility in isohexane of complex 88 with 10 equivalents tri(n-octyl)aluminum (6.0 mM Zr target). Finely divided solid complex 88 (0.0287 g, 0.0313 mmol) was combined with isohexane (4.53 mL) and 25 wt % tri(n-octyl)aluminum in isohexane (0.459 g, 0.6548 mL, 0.313 mmol) in a scintillation vial. A stir bar was added and the mixture was capped. The heterogeneous mixture was then stirred rapidly (1000 rpm) at ambient temperature (22±2° C.). After 300 minutes all visible solids had dissolved to form a pale brown-tinted homogeneous solution indicating that the solubility of complex 88 in isohexane with 10 equivalents of tri(n-octyl)aluminum is at least 6.00 mM.

Example 88-6

Polymerization of 1-octene using catalyst from Example 88-3. Isohexane (6 mL) and 1-octene (5 mL) were combined in a 20 mL vial. A stir bar was added and the mixture was heated to 60° C. A solution of tri(n-octyl)aluminum scavenger (0.010 mL of 0.5 M in hexane, 0.005 mmol) was added. An isohexane solution of bis(octadecyl)methylammonium tetrakis(pentafluorophenyl)borate (0.040 mL of 5 mM solution, 200 nmol) was then added followed by 0.100 mL of the solution prepared in example 88-3 (200 nmol Zr). The mixture was stirred for 30 minutes during which time it became viscous. The reaction was quenched by the addition of tetrahydrofuran (3 drops). The solution was evaporated at 120° C. under a stream of nitrogen to afford polyoctene as a sticky colorless amorphous solid. Yield 1.57 g.

All documents described herein are incorporated by reference herein, including any priority documents and/or testing procedures to the extent they are not inconsistent with this text. As is apparent from the foregoing general description and the specific embodiments, while forms of the present disclosure have been illustrated and described, various modifications can be made without departing from the spirit and scope of the present disclosure. Accordingly, it is not intended that the present disclosure be limited thereby. Likewise, the term "comprising" is considered synonymous with the term "including." Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to one having ordinary skill in the art and having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein.

The invention claimed is:

1. A solution comprising:
   a non-metallocene transition metal complex dissolved in an aliphatic hydrocarbon solvent at a concentration ranging from about 2 mM to about 20 mM at 23° C. in the presence of an organoaluminum compound;
   wherein a molar ratio of aluminum of the organoaluminum compound to transition metal of the non-metallocene transition metal complex is about 1:1 or greater, and the organoaluminum compound comprises at least about 8 carbons per aluminum; and
   wherein the non-metallocene transition metal complex has an aliphatic hydrocarbon solubility of less than 2 mM in an absence of the organoaluminum compound.

2. The solution of claim 1, wherein a reaction product of the non-metallocene transition metal complex and the organoaluminum compound or an adduct of the non-metallocene transition metal complex and the organoaluminum compound is dissolved in the aliphatic solvent.

3. The solution of claim 1, wherein the non-metallocene transition metal complex has a structure represented by $LM(X)_2$;
   wherein M is a transition metal, L is a dianionic ligand coordinated to M, and X is an anionic group containing six or fewer non-hydrogen atoms, or two Xs are joined to form a ring defining a chelating ligand, a diene ligand or an alkylidene ligand.

4. The solution of claim 3, wherein each X is a $C_1$-$C_6$ hydrocarbyl group.

5. The solution of claim 3, wherein each X is a methyl group.

6. The solution of claim 1, wherein the non-metallocene transition metal complex comprises at least one complex selected from the group consisting of a pyridyldiamide, a quinolinoyldiamide, a bis(phenolate), and a heterocyclic amide complex.

7. The solution of claim 1, wherein the solution comprises at most about 5 ppm aromatic solvent.

8. The solution of claim 7, wherein the aromatic solvent comprises toluene.

9. The solution of claim 1, wherein the organoaluminum compound comprises at least one compound selected from the group consisting of a trialkylaluminum, a bis(dialkylaluminum) oxide, a dialkylaluminum hydride, a dialkylaluminum alkoxide, an alkylaluminum bisalkoxide, an aluminum trisalkoxide, a dialkylaluminum halide, an alkylaluminum dihalide, and any combination thereof.

10. The solution of claim 1, wherein the organoaluminum compound comprises at least one compound selected from the group consisting of a trialkylaluminum, a bis(dialkylaluminum)oxide, a dialkylaluminum hydride, and any combination thereof.

11. The solution of claim 1, wherein the organoaluminum compound comprises two or more alkyl groups, and the alkyl groups are $C_3$ or larger.

12. The solution of claim 1, wherein the organoaluminum compound comprises at least 12 carbons per aluminum.

13. The solution of claim 1, wherein the aliphatic hydrocarbon solvent comprises a linear, branched, cyclic, or branched cyclic aliphatic hydrocarbon having 9 or fewer carbons.

14. The solution of claim 1, wherein the aliphatic hydrocarbon solvent is methylcyclohexane, isohexane, or any combination thereof.

15. The solution of claim 1, wherein the solution consists essentially of the non-metallocene transition metal complex, the aliphatic hydrocarbon solvent, and the organoaluminum compound.

16. A catalyst system comprising:
   the solution of claim 1; and
   at least one activator effective to activate the non-metallocene transition metal complex.

17. The catalyst system of claim 16, wherein the at least one activator comprises an activator selected from the group consisting of an alumoxane, a non-coordinating anion activator, and any combination thereof.

18. The catalyst system of claim 16, wherein the at least one activator comprises a non-coordinating anion activator, and the non-coordinating anion activator comprises an anion portion selected from the group consisting of tetrakis(perfluorophenyl)borate, tetrakis(perfluoronaphthyl)borate, and tetrakis(perfluorobiphenyl)borate.

19. The catalyst system of claim 16, wherein the catalyst system comprises at most about 5 ppm aromatic solvent.

20. The catalyst system of claim 19, wherein the aromatic solvent comprises toluene.

* * * * *